US012623340B2

(12) United States Patent
Vikas et al.

(10) Patent No.: US 12,623,340 B2
(45) Date of Patent: May 12, 2026

(54) DEVICE AND METHOD OF FABRICATION FOR DEXTEROUS CONTINUUM TENSEGRITY MANIPULATOR

(71) Applicant: The Board of Trustees of The University of Alabama, Tuscaloosa, AL (US)

(72) Inventors: Vishesh Vikas, Tuscaloosa, AL (US); Cole Woods, Tuscaloosa, AL (US)

(73) Assignee: The Board of Trustees of The University of Alabama, Tuscaloosa, AL (US)

( * ) Notice: Subject to any disclaimer, the term of this patent is extended or adjusted under 35 U.S.C. 154(b) by 32 days.

(21) Appl. No.: 18/419,095

(22) Filed: Jan. 22, 2024

(65) Prior Publication Data
US 2024/0246226 A1 Jul. 25, 2024

Related U.S. Application Data

(60) Provisional application No. 63/440,213, filed on Jan. 20, 2023.

(51) Int. Cl.
*B25J 9/06* (2006.01)
*B25J 9/00* (2006.01)
*B25J 9/10* (2006.01)

(52) U.S. Cl.
CPC ............. *B25J 9/065* (2013.01); *B25J 9/0009* (2013.01); *B25J 9/1045* (2013.01)

(58) Field of Classification Search
CPC . B25J 9/0009; B25J 9/065; B25J 9/104; B25J 9/1045
See application file for complete search history.

(56) References Cited

FOREIGN PATENT DOCUMENTS

| | | | | | | |
|---|---|---|---|---|---|---|
| CN | 107053155 A | * | 8/2017 | | | |
| CN | 110712196 A | * | 1/2020 | ............. | B25J 9/065 | |
| CN | 110802584 A | * | 2/2020 | | | |
| CN | 110900588 B | * | 5/2021 | ............. | B25J 9/065 | |
| CN | 112873190 A | * | 6/2021 | ............ | B25J 9/1045 | |
| CN | 113752243 A | * | 12/2021 | ............. | B25J 9/142 | |
| CN | 114367965 A | * | 4/2022 | | | |
| CN | 114367969 A | * | 4/2022 | ............ | B25J 9/1045 | |
| CN | 114851180 A | * | 8/2022 | ............ | B25J 9/1697 | |

OTHER PUBLICATIONS

Ingber, D. E., 1993. "Cellular tensegrity: defining new rules of biological design that govern the cytoskeleton". Journal of cell science, 104(3), pp. 613-627.

(Continued)

*Primary Examiner* — William C Joyce
(74) *Attorney, Agent, or Firm* — Meunier Carlin & Curfman LLC

(57) ABSTRACT
A continuum manipulator that comprises an assembly of 'vertebra'-like modules fabricated using two curved links and twelve strings and actuated using Motor-Tendon Actuators. The modules being modeled as tensegrity structures having a polyhedron shape. The vertices and edges of the tensegrity structure polyhedron correspond to the holes and strings or links of the structure. Furthermore, a mobile continuum manipulator that includes a control unit and wheels or mobile legs.

20 Claims, 11 Drawing Sheets

(56)          References Cited

OTHER PUBLICATIONS

Connelly, R., 2002. "Tensegrity structures: why are they stable?". In Rigidity theory and applications. Springer, pp. 47-54.

Skelton, R. E., Montuori, R., and Pecoraro, V., 2016. "Globally stable minimal mass compressive tensegrity structures". Composite Structures, 141, pp. 346-354.

Ikemoto, S., Tsukamoto, K., and Yoshimitsu, Y., 2021. "Development of a modular tensegrity robot arm capable of continuous bending". Frontiers in Robotics and AI, 8, 11.

Ramadoss, V., Sagar, K., Ikbal, M. S., Calles, J. H. L., Siddaraboina, R., and Zoppi, M., 2022. "Hedra: A bioinspired modular tensegrity robot with polyhedral parallel modules". In 2022 IEEE 5th International Conference on Soft Robotics (RoboSoft), pp. 559-564.

Sabelhaus, A. P., van Vuuren, L. J., Joshi, A., Zhu, E., Garnier, H. J., Sover, K. A., Navarro, J., Agogino, A. K., and Agogino, A. M., 2018. "Design, simulation, and testing of a flexible actuated spine for quadruped robots". arXiv.

Sabelhaus, A. P., Ji, H., Hylton, P., Madaan, Y., Yang, C., Agogino, A. M., Friesen, J., and SunSpiral, V., 2015. "Mechanism design and simulation of the ultra spine: a tensegrity robot". In International Design Engineering Technical Conferences and Computers and Information in Engineering Conference, vol. 57120, American Society of Mechanical Engineers, p. V05AT08A059.

Zappetti, D., Mintchev, S., Shintake, J., and Floreano, D., 2017. "Bio-inspired tensegrity soft modular robots". In Conference on Biomimetic and Biohybrid Systems, Springer, pp. 497-508.

Fasquelle, B., Furet, M., Khanna, P., Chablat, D., Chevallereau, C., and Wenger, P., 2020. "A bioinspired 3-dof light-weight manipulator with tensegrity x-joints*". p. 5054-5060.

Zappetti, D., Arandes, R., Ajanic, E., and Floreano, D., 2020. "Variable-stiffness tensegrity spine". p. 075013.

Rhodes, T., Gotberg, C., and Vikas, V., 2019. "Compact Shape Morphing Tensegrity Robots Capable of Locomotion". Frontiers in Robotics and AI, 6, 111.

Kobayashi, R., Nabae, H., Endo, G., and Suzumori, K., 2022. "Soft tensegrity robot driven by thin artificial muscles for the exploration of unknown spatial configurations". IEEE Robotics and Automation Letters, 7(2), pp. 5349-5356.

Tibert, A., and Pellegrino, S., 2003. "Review of formfinding methods for tensegrity structures". International Journal of Space Structures, 18(4), pp. 209-223.

Linkwitz, K., and Schek, H.-J., 1971. "Einige bemerkungen zur berechnung von vorgespannten seilnetzkonstruktionen". Ingenieurarchiv, 40(3), pp. 145-158. English Abstract Provided.

Skelton, R. E., and de Oliveira, M. C., 2009. "Analysis of Tensegrity Dynamics". In Tensegrity Systems, M. C. Oliveira and R. E. Skelton, eds. Springer US, Boston, MA, pp. 157-178.

Goyal, R., and Skelton, R. E., 2019. "Tensegrity system dynamics with rigid bars and massive strings". Multibody System Dynamics, 46(3), pp. 203-228.

Ma, S., Chen, M., Peng, Z., Yuan, X., and Skelton, R. E., 2022. "The Equilibrium and Form-Finding of General Tensegrity Systems with Rigid Bodies". Engineering Structures.

Murakami, H., 2001. "Static and dynamic analyses of tensegrity structures. Part 1. Nonlinear equations of motion". International Journal of Solids and Structures, 38(20), pp. 3599-3613.

Sultan, C. "Modeling, design, and control of tensegrity structures with applications". Ph.D., Purdue University, United States—Indiana. ISBN: 9780599540002.

Abourachid, A., Bohmer, C., Wenger, P., Chablat, D., Chevallereau, C., Fasquelle, B., and Furet, M., 2019. "Modelling, design and control of a bird neck using tensegrity mechanisms".

Tensegrity Robotics—NTRT—NASA Tensegrity Robotics Toolkit. https://github.com/NASA-Tensegrity-Robotics-Toolkit.

Weisstein, E. W. Snub Disphenoid. Publisher: Wolfram Research, Inc.

Gotberg, C., and Vikas, V. "Synthesis of tensegrity primitives using polyhedron and lexicographic ordering". Journal of Mechanisms and Robotics (under review).

Hudson, T. Tensegrity. https://trmm.net/Tensegrity/.

Euler, L., 1953. "Leonhard euler and the koenigsberg bridges". Scientific American, 189(1), pp. 66-72.

* cited by examiner

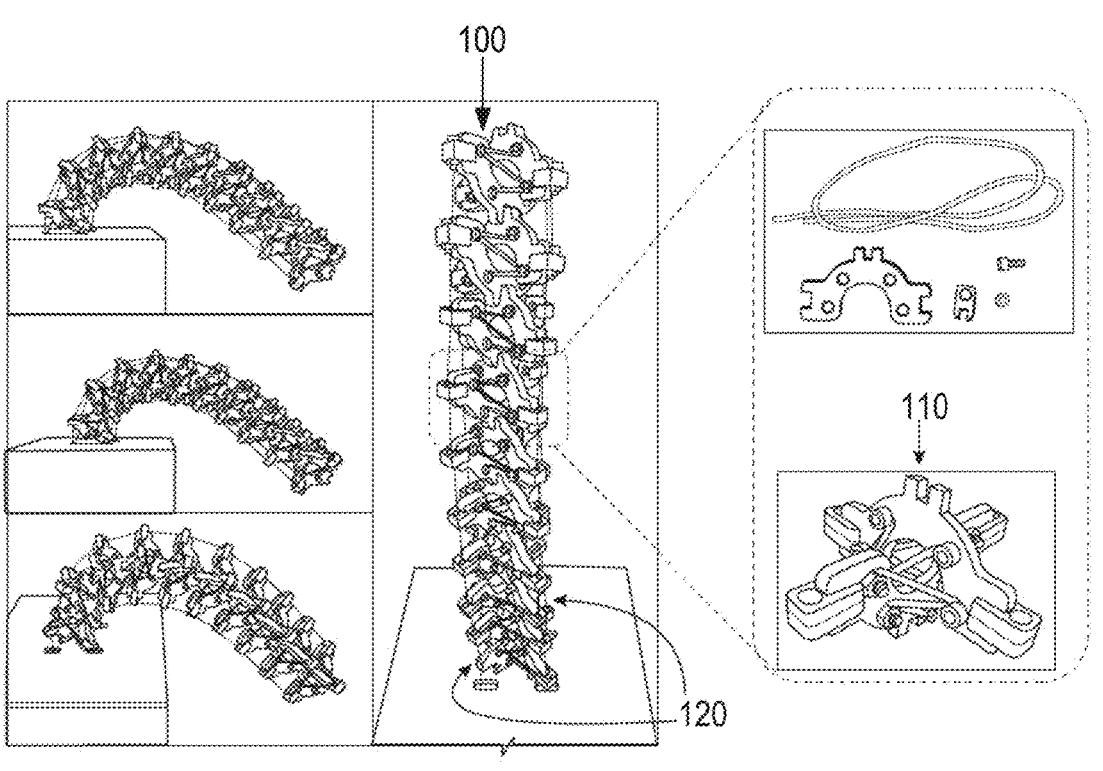
FIG. 1
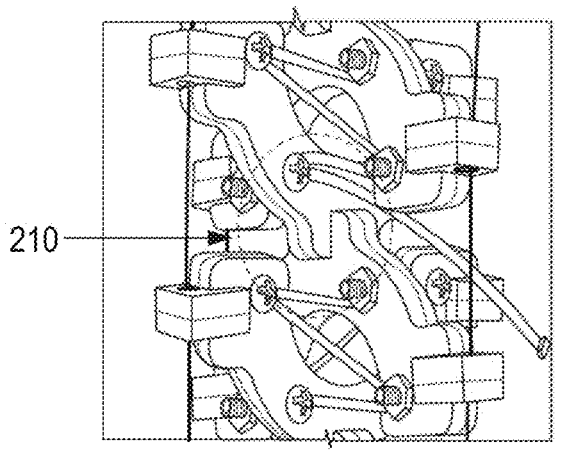
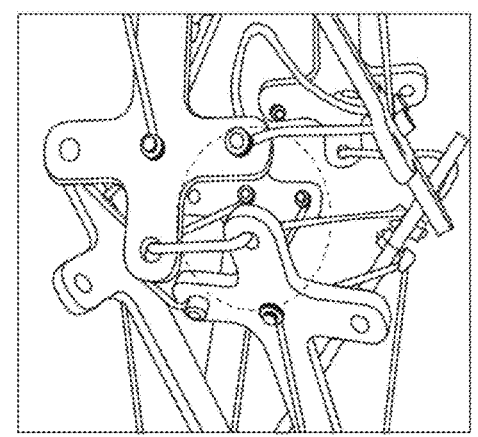
FIG. 2A          FIG. 2B

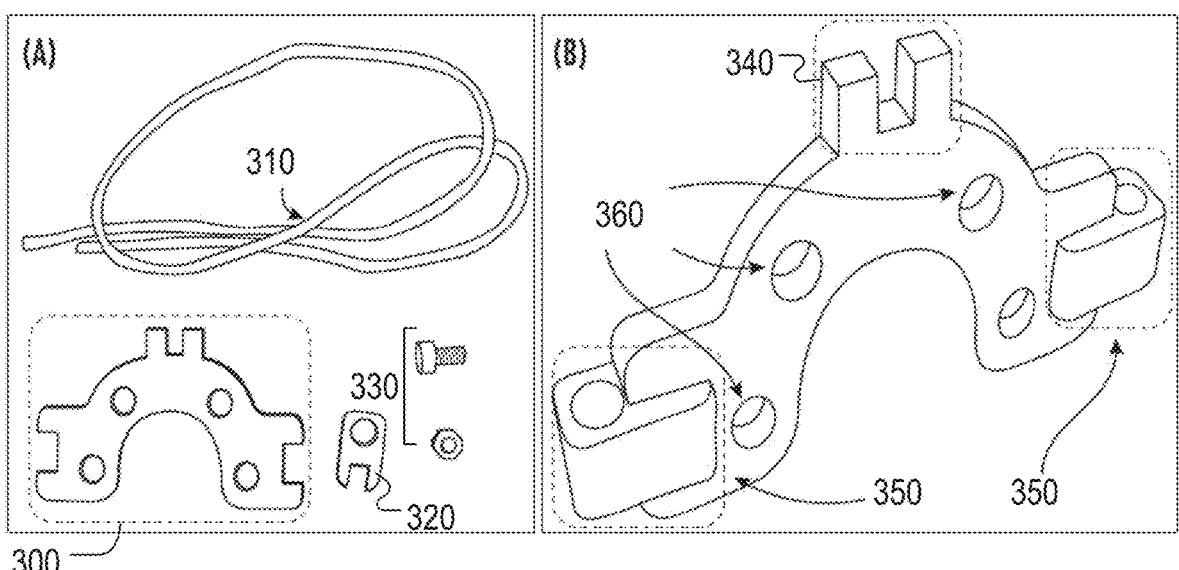
FIG. 3A
FIG. 3B
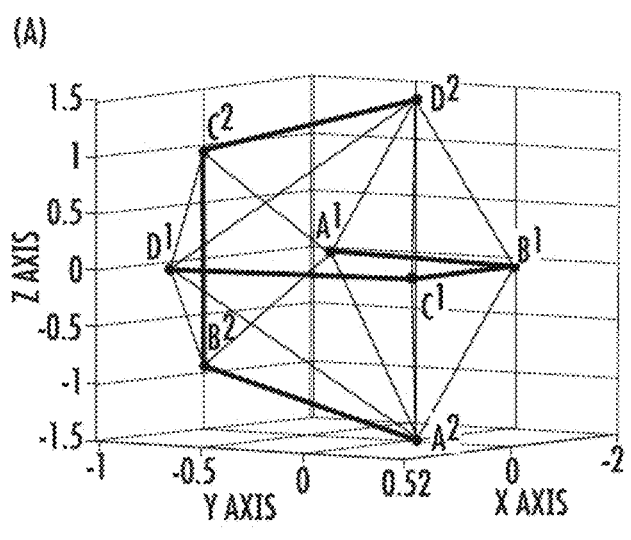
FIG. 4A
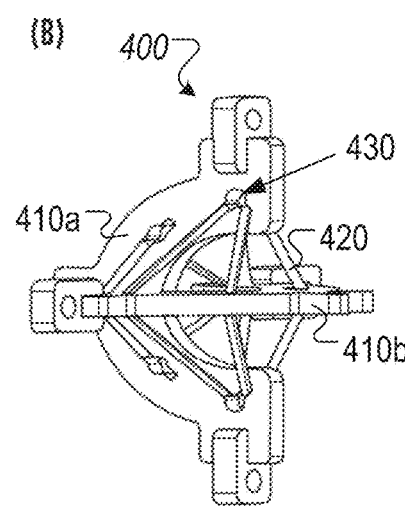
FIG. 4B

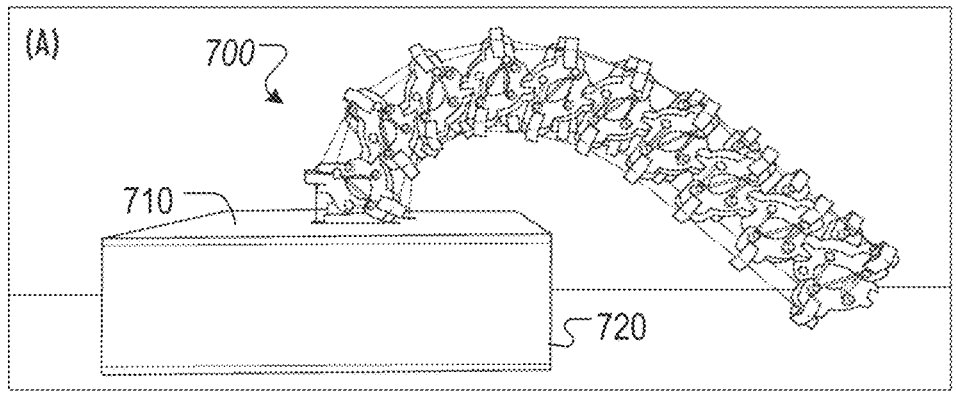
FIG. 7A
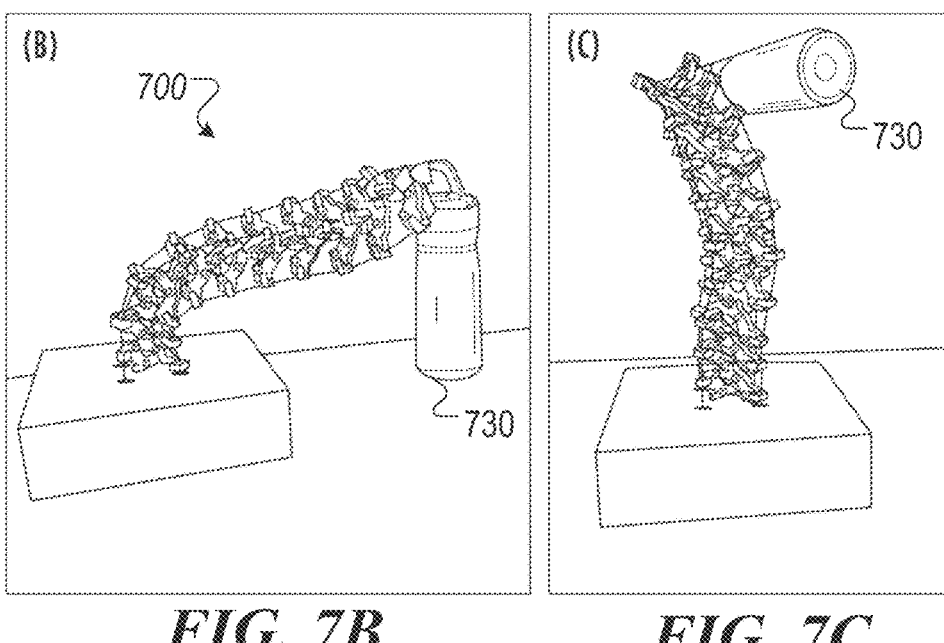
FIG. 7B          FIG. 7C
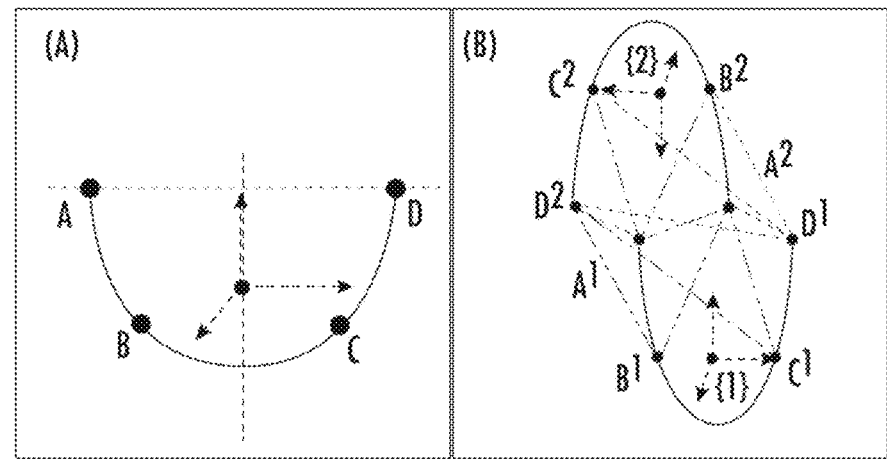
FIG. 8A          FIG. 8B

(A)

(B)

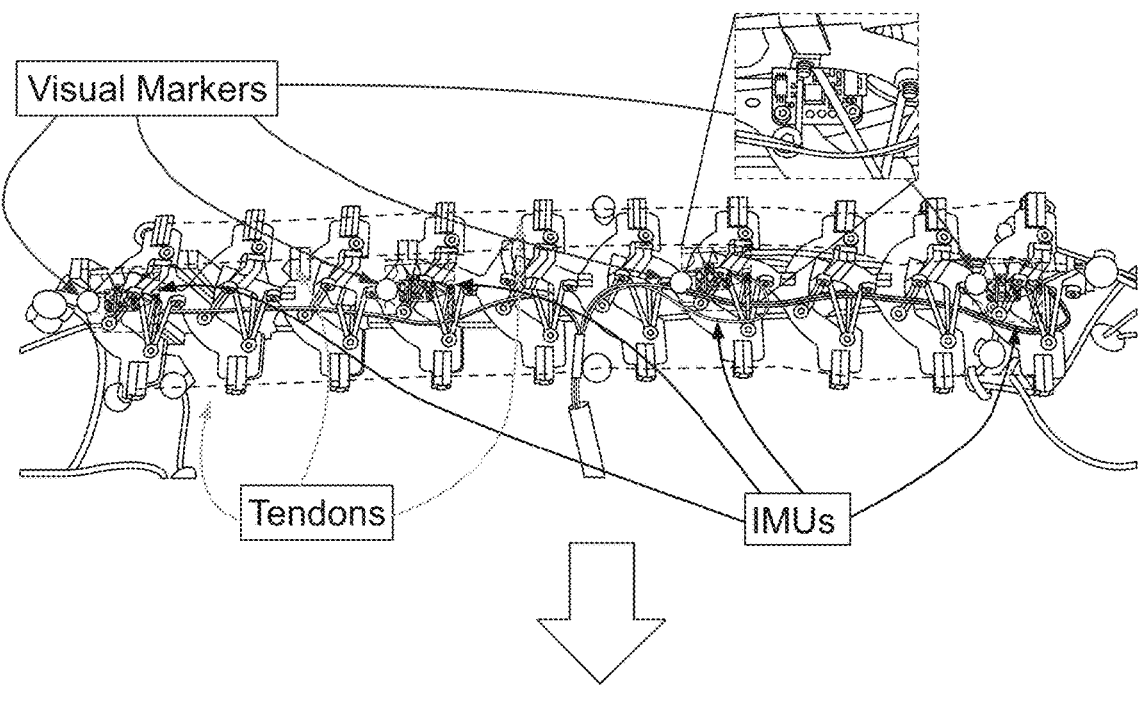
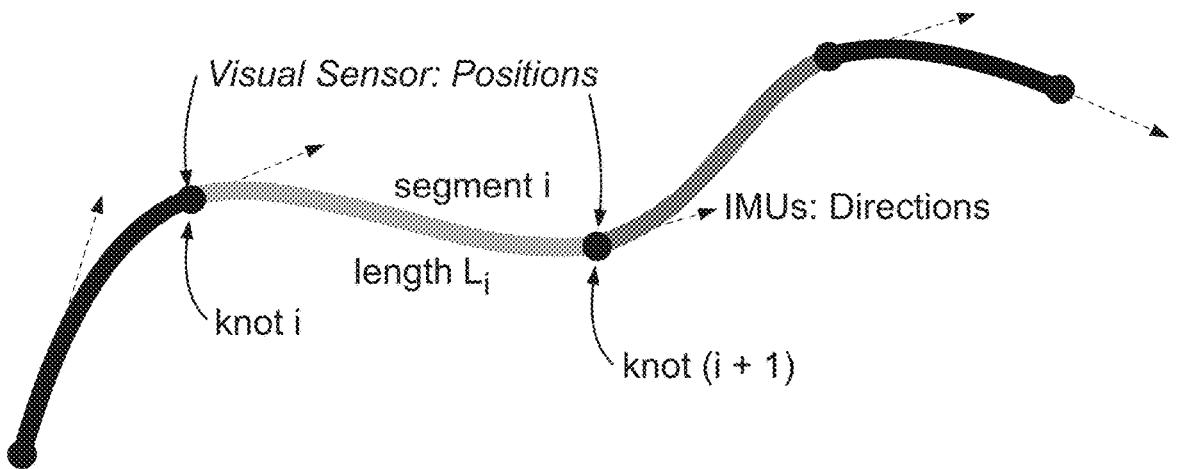
*FIG. 16*

(A)

(B)

DEVICE AND METHOD OF FABRICATION FOR DEXTEROUS CONTINUUM TENSEGRITY MANIPULATOR

CROSS REFERENCE TO RELATED APPLICATIONS

This patent application claims priority to, and the benefit of, U.S. provisional application, U.S. 63/440,213, filed on Jan. 20, 2023, which is hereby incorporated by reference herein in its entirety.

ACKNOWLEDGEMENT OF GOVERNMENT SUPPORT

This invention was made with government support under grant no. 1832993 awarded by the National Science Foundation. The government has certain rights in the invention.

TECHNICAL FIELD

The disclosure generally relates to mechanical devices comprising tension and compression elements and methods related thereto.

BACKGROUND

Tensegrity mechanisms synergistically combine tension elements (pre-stressed cables) with compression elements (rigid rods) to achieve structural integrity. This concept is prevalent from the model of the universe where the compression elements (heavenly bodies) are floating in a sea of tension (gravitational force) to micro-scale biological organisms (Ingber, D. E., 1993. "Cellular tensegrity: defining new rules of biological design that govern the cytoskeleton". *J. Cell Sci.* 104(3):613-627). From an engineering perspective, these mechanisms are packable, portable, internally stable (i.e., do not require gravity for maintaining structural integrity), and possess high strength-to-weight ratios (Connelly, R., 2002. "Tensegrity structures: why are they stable?". In *Rigidity theory and applications*. Springer, pp. 47-54; Skelton, R. E., et al., 2016. "Globally stable minimal mass compressive tensegrity structures". *Composite Structures*, 141, pp. 346-354). This makes them ideal for applications relating to space, bio-mechanical modeling and robotic manipulation. These advantages can be viewed as a result of the strategic interaction between the tension-compression elements that preserves the structural integrity of the mechanism. However, this combination of the two antagonistic members poses design and modeling challenges.

Complex tensegrity systems result from assembly of smaller, fundamental primitive units or tensegrity modules. For example, Ikemoto et al. (2021. "Development of a modular tensegrity robot arm capable of continuous bending". *Frontiers in Robotics and AI,* 8, 11) made a modular tensegrity robot arm that comprised of five modules of four link tensegrity prisms that used twenty pneumatic cylinders to actuate each rigid member; Ramadoss et al. (2022. "Hedra: A bioinspired modular tensegrity robot with polyhedral parallel modules". In 2022 IEEE 5th International Conference on Soft Robotics (RoboSoft), pp. 559-564), a modular tensegrity arm that has five modules and used three cables to move the arm; Sabelhaus et al. (2018. "Design, simulation, and testing of a flexible actuated spine r quadruped robots". arXiv, Sabelhaus, A. P., et al., 2015. "Mechanism design and simulation of the ultra spine: a tensegrity robot". In International Design Engineering Technical Conferences and Computers and Information in Engineering Conference, Vol. 57120, American Society of Mechanical Engineers, p. V05AT08A059) a spine for a quadruped with five vertebrae, three of which were active and change the length of cables using motors; Zappeti et al. (2017. "Bioinspired tensegrity soft modular robots". In Conference on Biomimetic and Biohybrid Systems, Springer, pp. 497-508), an icosahedron modular robot that had three modules. Here, all the modular tensegrity robots use node-to-cable connections between consecutive modules, except for Zeppettii et al., where the authors use node-to-node approach to connect the triangular face of consecutive icosahedrons. The use of node-to-node connections when applicable, has potential to tremendously simplify the design.

Despite interest in tensegrity mechanisms since their conception by Buckminster Fuller in the 1960s, their fabrication methodology remains minimally discussed in literature given its arduous nature. It is further complicated with integration of actuators. For example, Ikemoto, S., et al., Ramadoss, V. et al., Sabelhaus, A. P., 2018, Sabelhaus, A. P., 2025, and Fasquelle, B., e al. (2020. "A bioinspired 3-dof light-weight manipulator with tensegrity x-joints*". p. 5054-5060) all fabricated tensegrity spine-like structures, however, only (Ramadoss, V. et al.) has less actuators than the total number of modules. From the perspective of design, systems with less number of actuators are easier to fabricate. Increasing the number of actuators potentially provides more controllability over the system, e.g., variation in stiffness and shape change. However, this comes at the cost of complexity in design and control (computation power and algorithm). Passively, Zappetti et al. (2020. "Variable-stiffness tensegrity spine". p. 075013) fabricated a tensegrity spine with variable stiffness. Rhodes et al. (2019. "Compact Shape Morphing Tensegrity Robots Capable of Locomotion". *Frontiers in Robotics and AI,* 6) fabricated a tensegrity robot that could change its shape. Kobayashi et al. (2022. "Soft tensegrity robot driven by thin artificial muscles for the exploration of unknown spatial configurations". *IEEE Robotics and Automation Letters,* 7(2), pp. 5349-5356) made a six-bar modular robot that could change its shape and locomote where each module could move on its own. Despite interest and exploration of tensegrity mechanisms as robot locomotors and manipulators, their fabrication and design methodology is understudied in the literature. This is due to the piece-wise continuous nature of the rigid-tension elements, i.e., sudden change from tension to compression at nodes.

Modeling of the highly nonlinear tensegrity systems has been widely investigated to obtain their static equilibrium, commonly termed as form-finding (Tibert, A., et al., 2003. "Review of form finding methods for tensegrity structures". *Intl. J. Space Structures,* 18(4):209-223). The use of Force Density Method (FDM) introduced by Linkwitz and Schek has been instrumental in linearization of the system (Linkwitz, K., et al., 1971. "Einige bemerkungen zur berechnung von vorgespannten seilnetzkonstruktionen". *Ingenieur-archiv,* 40(3): 145-158). Here, the force per unit length in the string allows the expression of the force in a string to be linearly dependent on the position of the start and the end node of the connection. Nevertheless, form-finding is challenging given the discontinuous (tension-compression) and the kinematically closed chain nature of the problem. In all the methods pursued by researchers, the most widely adopted approach uses a node-based framework to represent the different nodes of a system and the forces acting upon it (Skelton, R. E., and de Oliveira, M. C., 2009. "Analysis of Tensegrity Dynamics". In *Tensegrity Systems,*

M. C. Oliveira and R. E. Skelton, eds. Springer U S, Boston, M A, pp. 157-178; Goyal, R., et al., 2019. "Tensegrity system dynamics with rigid bars and massive strings". *Multibody System Dynamics,* 46(3):203-228; Ma, S., et al., 2022. "The Equilibrium and Form-Finding of General Tensegrity Systems with Rigid Bodies". *Engineering Structures*; Murakami, H., 2001. "Static and dynamic analyses of tensegrity structures. Part 1. Nonlinear equations of motion". *Intl. J. Solids Structures,* 38(20):3599-3613; Sultan, C. "Modeling, design, and control of tensegrity structures with applications". Ph.D., Purdue University, United States— Indiana. ISBN: 9780599540002). The node-based framework has proven to be effective, however, it does have its shortcomings. For example, the requirement of external forces and torques to be represented in the global coordinate system, and inclusion of additional non-convex, nonlinear length constraints in the system dynamics. The former leads to increase in computation and decrease in computation accuracy for including external forces and torques represented in the local/body coordinate system. Similarly, the latter results in increase of computation time for satisfying the non-linear, non-smooth length constraint. Next, the dynamic modeling is performed using different methodologies including principles of virtual work. Abourachid et al. use Lagrangian-approach for deriving the dynamics of a series of X-bar mechanisms that simulates a bird's neck. Ma et al. apply the node-based framework for modeling a tensegrity spine. A lot of researchers use the NASA Tensegrity Robotics Toolkit (NTRT) for modeling, which is based on the aforementioned node-based framework. All these analyses assume the system tensile elements to be prestressed strings that are non-compliant, i.e., strings do not have spring-like behavior. Furthermore, despite all these investigations, the dynamic modeling of tensegrity systems remains under-researched due to the difficulties faced to integrate dynamic analysis into the existing modeling frameworks.

SUMMARY

In accordance with the purposes of the disclosed materials, compounds, compositions, and methods, as embodied and broadly described herein, the disclosed subject matter, in one aspect, relates to a device and methods of making and using said device. Specifically, the field of tensegrity faces challenges in design to facilitate efficient fabrication and modeling due to the antagonistic nature of tension and compression elements. This disclosure teaches design methodology and modeling framework for a human spine inspired dexterous continuum tensegrity manipulator. The continuum manipulator comprises of an assembly of 'vertebra' modules fabricated using two curved links and twelve strings and actuated using Motor-Tendon Actuators. The fabrication methodology involves construction of the equivalent graph of the module and finding the Euler path that traverses every edge of the graph exactly once. The vertices and edges of the graph correspond to the holes and strings or links of the mechanism. Unlike traditional rigid manipulators, the design results in centralization of the majority of the weight of the actuators at the base with negligible effect on the manipulator dynamics. For the first time in literature, a tensegrity manipulator assembled using ten (10) modules is taught, which provides an increased time- and cost-efficiency manufacturing and assembly method.

In some aspects, the device described herein relates to a manipulator including a plurality of modules interlocked to form a linear arrangement of modules, wherein a module includes two rigid elements and a plurality of tension-compliant elements coupled to the two rigid elements through a plurality of holes in the two rigid elements, wherein the two rigid elements do not touch, wherein each of the two rigid elements includes an assembly connector, whereby the plurality of modules are coupled by interlocking assembly connectors of respective modules.

In some aspects, the device described herein relates to a manipulator, wherein a rigid element includes a two-dimensional shape forming a half-circle and the assembly connector oriented radially.

In some aspects, the device described herein relates to a manipulator, wherein a tension-compliant element includes a prestressed string or cord.

In some aspects, the device described herein relates to a manipulator, wherein the module includes a polyhedron shape, wherein edges and vertices of the polyhedron shape are formed by the tension-compliant elements and holes of the two rigid elements.

In some aspects, the device described herein relates to a manipulator, wherein the plurality of modules are rigidly coupled by interlocking the assembly connector of respective modules.

In some aspects, the device described herein relates to a manipulator wherein the plurality of tension-compliant elements are secured to the two rigid elements with a rigid assembly, wherein the rigid assembly prevents movement between a tension compliant element and a rigid element.

In some aspects, the device described herein relates to a manipulator, wherein a module further includes a first and second tendon connectors oriented radially and equally spaced on either side of the assembly connector and a first and second tendon attachment, wherein each tendon attachment includes a hole through which a tendon is positioned.

In some aspects, the device described herein relates to a manipulator, further including a plurality of actuators positioned at a proximal end of the manipulator, a plurality of tendons connecting the plurality of actuators and the plurality of modules, and a means for gripping at a distal end of the manipulator, wherein a number of tendons and number of actuators are the same.

In some aspects, the device described herein relates to a manipulator, wherein the plurality of actuators includes motor-tendon actuators.

In some aspects, the device described herein relates to a manipulator, including ten modules, four tendons, and four actuators, wherein each module includes twelve tension-compliant elements and four holes in each of the two rigid elements.

In some aspects, the device described herein relates to a manipulator, wherein the manipulator exhibits a strength-to-weight ratio of at least 3.

In some aspects, the device described herein relates to a manipulator, further including a base plate, wherein the base plate is positioned above the plurality of actuators and below a first module from the proximal end of the manipulator.

In some aspects, the device described herein relates to a manipulator, further including a base housing, wherein the base housing encases the plurality of actuators, and a control unit.

In some aspects, the device described herein relates to a manipulator, wherein a plurality of wheels or a plurality of mobile legs are coupled to the base housing.

In some aspects, the device described herein relates to a manipulator, further including a covering around the manipulator, the base housing, or both.

In some aspects, the device described herein relates to a manipulator, wherein one or more sensors are coupled to the modules of the manipulator.

In some aspects, the device described herein relates to a manipulator, wherein the one or more sensors include LiDAR, vision, inertial measurement unit, or combinations thereof.

In some aspects, the device described herein relates to a device a plurality of said manipulators.

In some aspects, the device, further includes a base plate, wherein the base plate is positioned above the plurality of actuators and below a first module from the proximal end of the plurality of manipulators.

In some aspects, the device, further includes a base housing, wherein the base housing encases the plurality of actuators and a control unit, and wherein a plurality of wheels and mounts are coupled to the base housing.

Additional advantages will be set forth in part in the description that follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE FIGURES

The accompanying Figures, which are incorporated in and constitute a part of this specification, illustrate several aspects described below.

FIG. 1 shows a continuum manipulator including serially attached vertebrae and is controlled using four Motor-Tendon Actuators.

FIG. 2A shows vertex-to-vertex inter-modular connection. FIG. 2B shows string-to-vertex inter-modular connection.

FIG. 3A shows elementary fabrication elements include string, link, tendon attachment, and assembly screw and nut. FIG. 3B shows resulting sub-vertebra structure upon integration of the tendon attachments.

FIG. 4A shows a base snub disphenoid graph corresponding to the vertebra module where the thin lines indicate the strings (connected edges) and thick lines indicate the two curved links (unconnected edges) having four holes (vertices) A,B,C,D. FIG. 4B shows a CAD model of the vertebra with strings.

FIG. 7A shows the manipulator in one of the poses with integrated MTAs. The four motors are housed in the enclosure below the base plate. The power supply, microcontroller, and four motor drivers are placed externally. FIG. 7B shows the manipulator with water bottle sitting on table. FIG. 7C shows the manipulator with water bottle fully lifted.

FIG. 8A shows each vertebra comprises of two links (semicircular lines) and twelve strings (dotted lines). The four element interaction points A,B,C,D on each link are defined with respect to the link coordinate system. FIG. 8B shows two links joined by twelve strings $A^1A^2$, $A^1B^2$, $A^1C^2$, $A^1D^2$, $D^1A^2$, $D^1B^2$, $D^1C^2$, $D^1D^2$, $B^1B^2$, $B^1C^2$, $C^1B^2$, $C^1C^2$. The two coordinate systems {1}, {2} are related by a screw $\xi$.

FIG. 16 shows the position of sensors and visual sensors.

DETAILED DESCRIPTION

Figure 5:
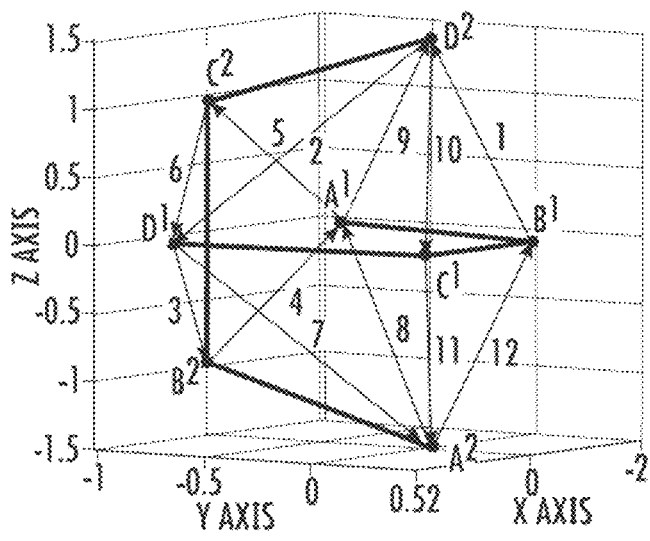
FIG. 5 shows the Euler path which passes through each edge only once.

The materials, compounds, compositions, articles, and methods described herein may be understood more readily by reference to the following detailed description of specific aspects of the disclosed subject matter and the Examples and Figures included therein.

Before the present materials, compounds, compositions, kits, and methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

In this specification and in the claims that follow, reference will be made to a number of terms, which shall be defined to have the following meanings:

The following nomenclature is used:

$N_n$ Number of vertices on a rigid link $N_c$ Number of string connections between vertebrae links P Node matrix, $\in R^{4 \times Nn}$ S String matrix, $\in R^{4 \times Nc}$ $C_i$ Connection matrix for link i, $\in R^{Nn \times Nc}$ SE(3) Special Euclidean group of dimension 3, $\in R^{4 \times 4}$ se(3) Lie algebra of the Lie group SE(3), $\in R^{4 \times 4}$ so(3) Lie algebra of the Special Orthogonal group of dimension 3, $\in R^{3 \times 3}$ $\xi$ Screw associated with two coordinate systems, $\in R^{6 \times 1}$ $T_{ab}$ Transformation matrix between coordinate systems {a} and {b}, $\in R^{4 \times 4}$ $k_j$ Stiffness of the j-th string $l_{0j}$ Free-length of the j-th string $l_j$ Length of the j-th string
$S_j$ String vector of j-th string
$f_{s,j}$ Magnitude of the force in the j-th string
$r_{s,j}$ Displacement vector of the string j from the COM Preface Described herein are continuum mobile manipulators engineered based on principles of tensegrity that have high strength-to-weight ratio and are energy efficient, stable and dynamic (move fast), as the actuators are located at the base of the manipulator. The continuum mobile manipulators are able to pick up heavier loads than similar sized manipulators/robots, and do not require counterweight for balancing. The continuum mobile manipulators provide a solution to automating tasks in dynamic environments (e.g., pick and place in warehouse environment, soil monitoring/seeding in agriculture). It is contemplated that the continuum mobile manipulators may be employed in warehouse/manufacturing, construction, agriculture, delivery, and security. In some examples, the continuum mobile manipulator comprises closed-loop control systems.

When compared to available commercial products, the disclosed mobile continuum manipulator has a high strength-to-weight ratio, is compliant, stable, more energy efficient and faster. Commercial mobile manipulators either have slow speed or cannot carry enough load due to the weight of the manipulator. For example, a commercial manipulator weighing 8 kg and can continuously carry 5 kg. In contrast, a manipulator of the disclosed continuum mobile manipulators weighs about 1 kg and can carry about 3 kg. Wheeled systems tend to be faster and heavier but lack mechanical safety compliance, which refers to safe operation around humans. The continuum mobile manipulator has built-in compliance due to the tensegrity structures comprising the manipulator, which reduces the system complexity and allows for safe operation and interaction with humans. In the described continuum mobile manipulator, the motors are placed at the base giving the system a built-in stability and counterweight when trying to lift objects, hence, energy efficiency when compared with traditional counterparts. Traditional robotic arms have motors placed along the arm which increases the moment of the arm, thus, increasing the need for a larger counterweight at the base to avoid tipping over when picking up objects. The disclosed continuum mobile manipulator is actuated to realize complex shapes and avoid obstacles.

A technical problem of tensegrity manipulators is the high manufacturing and fabrication time, which is solved by the design and fabrication methodology of the disclosed continuum mobile manipulator. Additional technical challenges arise due to the non-linear nature of the system, which makes it hard to control. Disclosed herein is a solution to the need of shape estimation/reconstruction by the use of machine learning techniques to facilitate feedback control.

The disclosed system is a lighter, stronger alternative that exhibits a low occurrence of tipping over. It is contemplated that the increased stability of the disclosed manipulator in a wheeled system could mean that they could be taller, which may be designed for more ground clearance to traverse tougher terrain. For quadrupeds, the disclosed manipulator could pick up heavier loads and could potentially have the ability of having two arms to increase the efficiency of the system.

Here, the tensegrity principles impart structural integrity to the system by synergistically combining tension elements (prestressed cables) with compression elements (rigid rods). The manipulator is inspired by the human spine and comprises of multiple tensegrity modules, referred to as the "vertebrae" of the spine. The shape of the manipulator will be controlled using four motor-tendon actuators that have the tendons run down the four sides of the spine-like structure to the base, where motors pull and release the tendons. As the motors are placed in the base, they act as a counterweight and provide stability when integrated into a mobile platform. More simplistically, as the center of mass of the manipulator is concentrated near the base and the mobile platform, it reduces the risk of tipping over and allows for faster movement of the robot while using less energy. This is in contrast to traditional manipulators where the motors are located along the manipulator at the joints.

In some examples, the manipulator is dynamically controlled using real-time feedback of its shape. The shape estimation algorithm involves sensor fusion of information from lidar, vision, and inertial measurement units (IMUs) positioned along the manipulator backbone. This process not only assesses the manipulator's shape but also pinpoints the location of the end effector irrespective of the payload. This crucial feedback enables the manipulator to maintain spatial awareness, minimize collisions, and efficiently reach its intended spatial target. Additionally, the system incorporates stereoscopic cameras to provide a visual representation of the environment surrounding it. This dynamic perspective ensures that the structure's movements are meticulously guided and controlled, making it adaptable and responsive to its environment. One of the main advantages of tensegrity mechanisms is their high strength-to-weight ratio—this allows for the possibility of placing multiple manipulators on a mobile platform to increase the productivity of the robot. Additionally, the built-in compliance will allow the manipulator to be safely used around humans and even interact with them.

Other technical benefits of the disclosed system will become apparent in the proceeding description and examples.

Device

Referring now to FIG. 1, a modularly designed continuum manipulator 100, inspired by the human spine, is disclosed. The continuum manipulator 100 combines a plurality of modules 110, where each module comprises two curved rigid elements joined together by tension-compliant elements, where the tension-compliant elements pass through a plurality of holes in the two rigid elements. In the design of the modules, the two rigid elements do not touch, which is a hallmark of tensegrity structures.

The linear arrangement of the continuum manipulator 100 is affixed with a number 5 of tendons 120 along the outer vertices of each module. The tendons connect the continuum manipulator to a set of actuators at the base of the manipulator, wherein the two rigid elements include respective assembly connectors, whereby the plurality of modules is coupled by assembly connectors elements of respective modules.

The modules are assembled into a linear arrangement using a vertex-to-vertex design, as shown in FIG. 2A. Alternatively, the modules are assembled into a linear arrangement using a string-to-vertex design, as shown in FIG. 2B.

Referring now to FIG. 3A, the modules are assembled using the following elementary fabrication elements: a link or rigid element 300, a string 310, which may be a continuous string, are coupled to the link 300, rigid assembly including a bolt and nut 330, which secures the tension-compliant element 310 to the link 300, and tendon attachment 320, which couples to the link 300, through which a tendon 120 is routed. In some aspects, the link or rigid element includes a two-dimensional shape forming a half-circle and an assembly connector oriented radially.

The link or rigid element 300 includes an assembly connector 340, by which the modules are assembled in the vertex-to-vertex design, as shown in FIG. 2A; vertices or holes 360, through which the string 310 are routed and fixed with the rigid assembly 330; and tendon connectors 350, by which the tendon attachment 320 is coupled to the link or rigid element 300, wherein the rigid assembly 330 includes a bolt and nut, and wherein the bolt transverses a hole 360 of a rigid element 300.

In some aspects, the tendon connectors 350 include two tendon connectors, oriented radially and equally spaced on either side of the assembly connector 340. The tendon connectors 350 are configured to couple with the tendon adaptor 320, wherein each tendon adaptor 320 includes a hole through which a tendon is positioned.

Referring now to FIGS. 4A and 4B, the assembled module 110, bears a polyhedron shape, wherein edges and vertices of the polyhedron shape are formed by the string 310 and connection holes 360 of two rigid elements 300. In FIG. 4A, the vertices of a first rigid element are labeled $A^1$, $B^1$, $C^1$, $D^1$, and the vertices of a second rigid element are labeled $A^2$, $B^2$, $C^2$, $D^2$, which correspond to the four hole 360 of each link or rigid elements 300. The edges related to the connecting lines of $A^1$-$A^2$; $A^1$-$B^2$; $A^1$-$C^2$; $A^1$-$D^2$; $D^1$-$A^2$; $D^1$-$B^2$; $D^1$-$C^2$; $D^1$-$D^2$; $B^1$-$A^2$; $B^1$-$D^2$; $C^1$-$A^2$; $C^1$-$D^2$, are formed by the string 310 and represent the tension-compression elements of the tensegrity structure. The edges $A^1$-$B^1$, $B^1$-$C^1$, and $C^1$-$D^1$ are formed by the first rigid element 410a; whereas the edges $A^2$-$B^2$, $B^2$-$C^2$, and $C^2$-$D^2$ are formed by the second rigid element 410b. As noted previously, the two rigid elements do not touch, which is a known feature of tensegrity structures.

As shown in FIG. 4B, the assembled module 110, includes the two rigid elements 410a, 410b, coupled by tension-compression elements 420, which are formed from the string 310 and connecting the two rigid elements 410a, 410b forming vertices 430 where the string 310 passes through the holes 360 of the rigid element. The assembly connector 340 of each rigid element extends outward along the $B^1$-$C^1$ and $B^2$-$C^2$ edges, respectively.

Figure 6A:
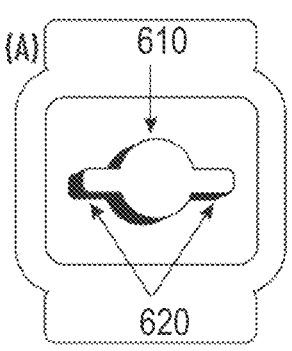
FIG. 6A shows the hole design that includes the main string channel and the pinch points that aid the form tuning process.

Referring now to FIG. 6A, the holes 360 of a rigid element 300, may be configured to provide a means for tuning the shape of the module via adjusting the tension of the string 310. A hole 610 includes pinch points 620, which provides a means for adjusting the tension of the string in a simplified manner.

In some aspects, the module includes two rigid elements 410a, 410b connected by twelve tension-compliant elements 420, which may be a prestressed string or cord. The tension-compliant elements 420 are secured between the two rigid elements 410a, 410b at the four vertices 430 of each rigid element 410a, 410b. The twelve tension-compliant elements 420 may be a continuous string or cord that is coupled to the two rigid elements in such a way as to form twelve tension-compliant elements.

The manipulator 100 is assembled with a plurality of modules 110 in a linear arrangement and a plurality of tendons 120 running parallel along the length of the linear arrangement. The plurality of modules is rigidly coupled by interlocking the assembly connectors of respective modules. In some aspects, the plurality of modules includes 4, 5, 6, 7, 8, 9, 10 or more modules.

The plurality of tendons is connected to a plurality of actuators, respectively, where the plurality of actuators are attached to the base or proximal end of the manipulator 100.

The manipulator further includes a means for gripping at a distal end of the article, which may be any commercially available robotic gripper or end effector. In some aspects, the actuators are motor-tendon actuators. In some aspects, the plurality of tendons includes 2, 3, 4, or more tendons, and the plurality of actuators includes 2, 3, 4, or more. In some implementations, the number of tendons is the same as the number of actuators. In other implementations, the number of tendons is more than the number of actuators.

Referring now to FIG. 7A, the manipulator 700 includes a manipulator arm 730 and a base plate 710, wherein the plurality of actuators is positioned on a bottom side and the manipulator arm is attached to the top side of the base plate 710. The base plate 710 may be part of a base housing 720, which encases the actuators. As noted previously, the manipulator exhibits improved stability because the actuators at the base of the manipulator provide a counterweight. An example of the manipulator gripping and lifting a payload is shown in FIGS. 7B and 7C, respectively.

Figure 15A:
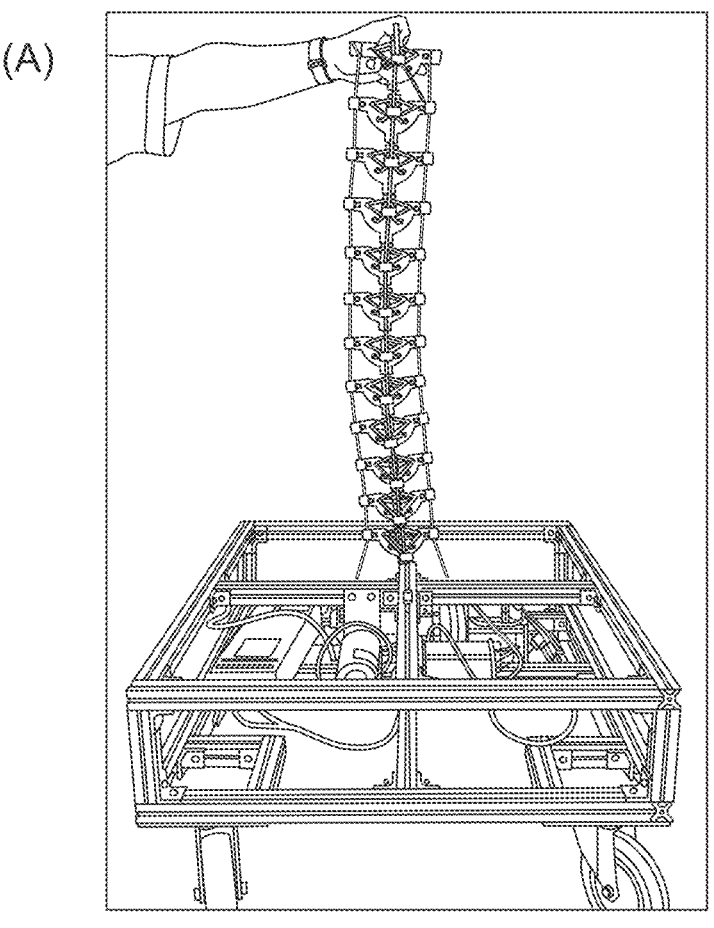
FIGS. 15A-15B show implementations of the manipulator into a mobile system on wheels (FIG. 15A) and mobile legs (FIG. 15B)
Figure 15B:
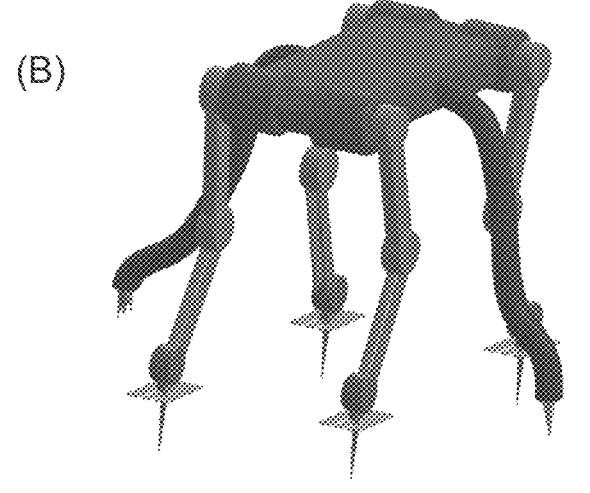

In some aspects, the manipulator 700 is configured with a plurality of wheels coupled to the base housing 720, as shown in FIG. 15A. Alternatively, or in addition, the manipulator 700 may be configured with a plurality of mobile legs coupled to the base housing, as shown in FIG. 15B. In some aspects, a manipulator is assembled with two or more manipulator arms 730 on one base housing 720, as shown in FIG. 15B.

In some aspects, one or more sensors are coupled to the manipulator arm, as shown in FIG. 16. The sensors may be visual sensors or inertial sensors, such as IMUs. The visual sensors may be cameras or LiDAR. Additionally or alternatively, visual markers are coupled to the manipulator as shown in FIG. 16. In some implementations, it may be beneficial to enrobe the manipulator arm and/or housing for safety and/or sanitary purposes, which is contemplated here as an additional feature of the manipulator.

Figure 18:
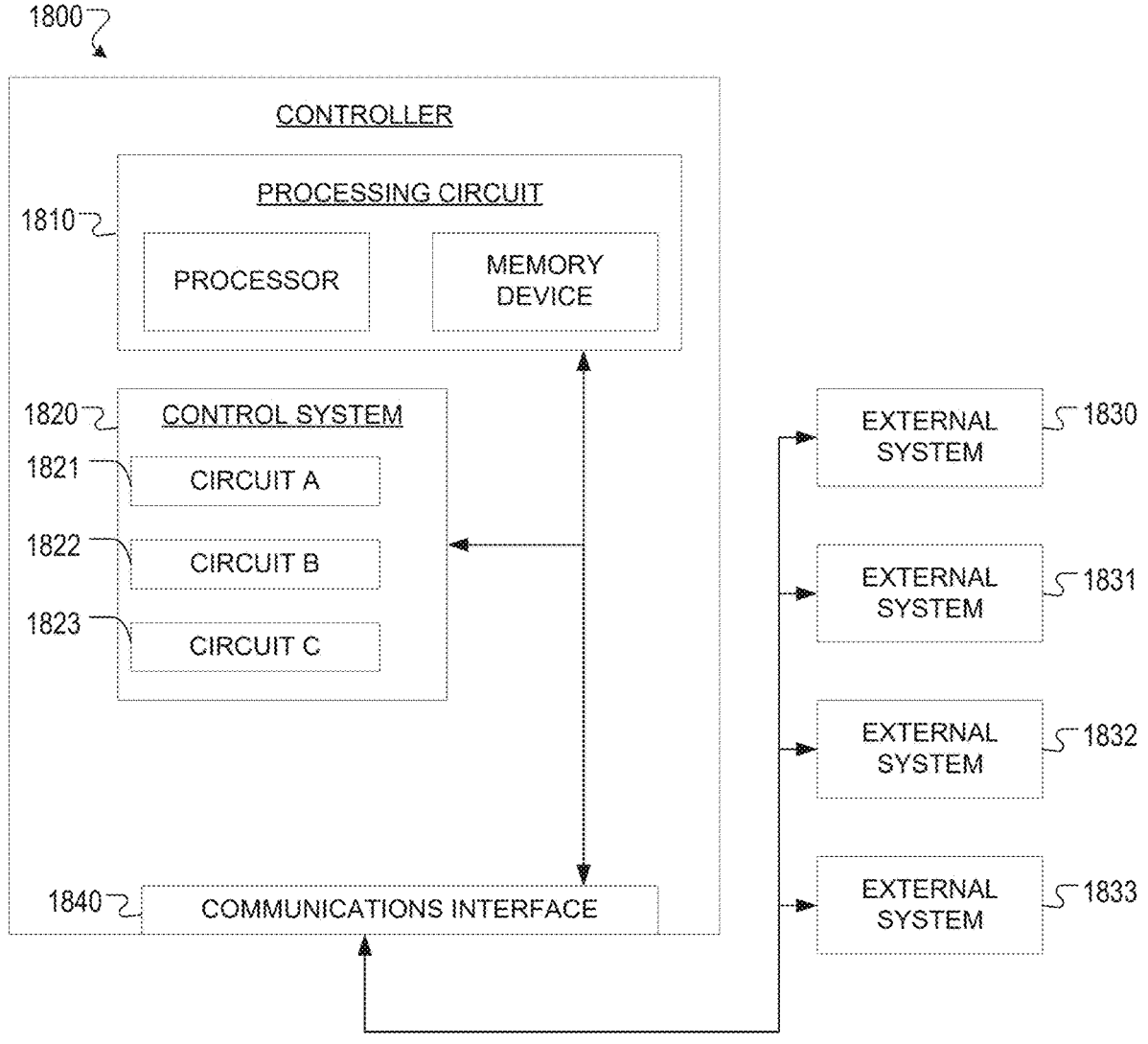
FIG. 18 shows an exemplary control unit.

In some aspects, the manipulator or manipulator device includes a control unit as shown in FIG. 18, which may be remotely operable or autonomously operable. In some aspects, the control unit is a closed-loop control system.

Figure 17A:
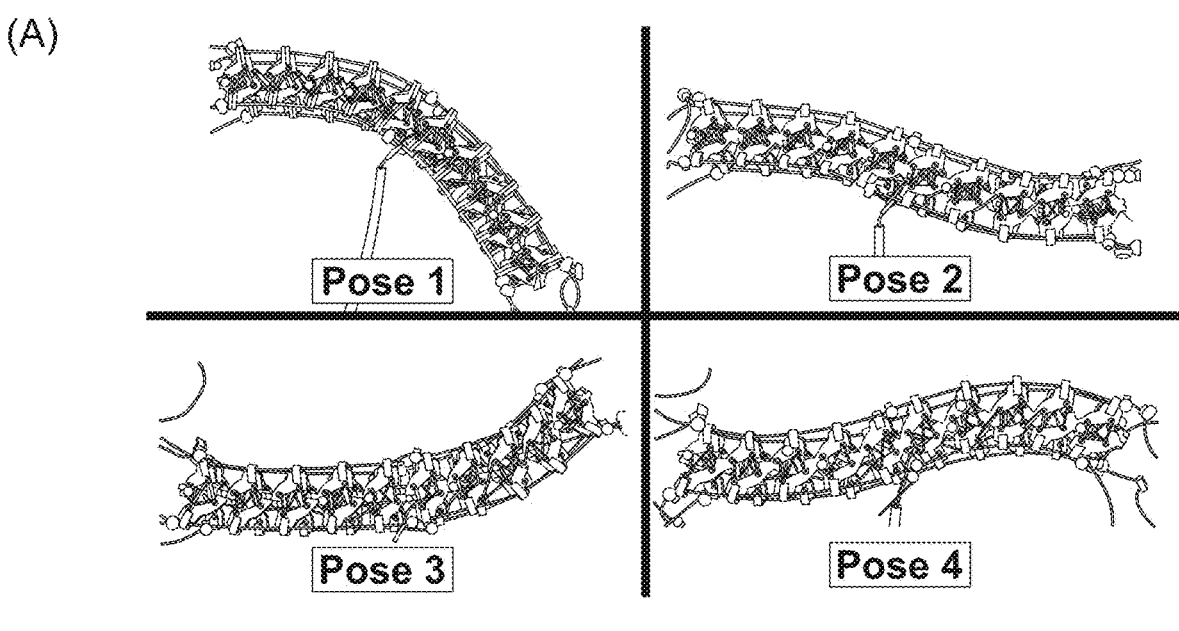
FIG. 17A-17B show example complicated shapes (FIG. 17A) and reconstruction of the same (FIG. 17B)
Figure 17B:
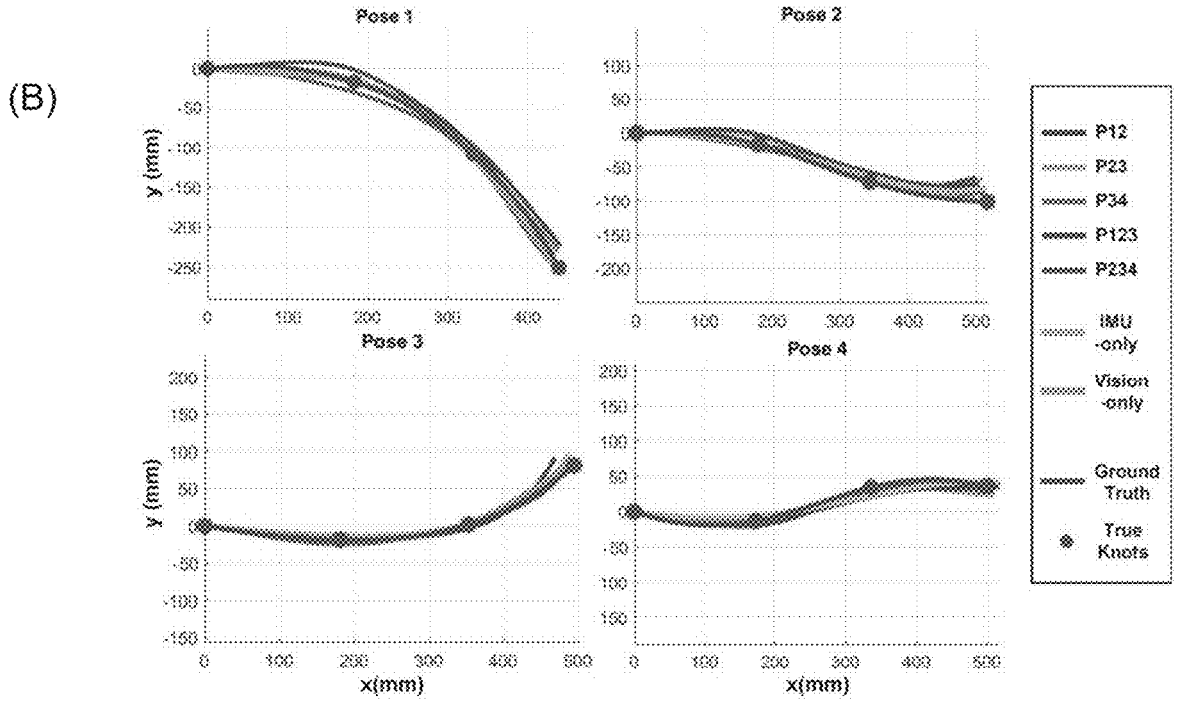

In some aspects, control unit dynamically controls the shape of the manipulator using real-time feedback from the attached sensors. The shape estimation algorithm involves sensor fusion of information from LiDAR, vision, and inertial measurement units (IMUs) positioned along the manipulator arm. This process not only assesses the manipulator's shape but also pinpoints the location of the end effector irrespective of the payload. This feedback enables the manipulator to maintain spatial awareness, minimize collisions, and efficiently reach its intended spatial target. Additionally, the manipulator system incorporates stereoscopic cameras to provide a visual representation of the environment surrounding it. An example of different poses of the manipulator are shown in FIG. 17A, and example reconstructed estimations are shown in FIG. 17B.

Examples of control units using sensor feedback can be found in 'Shape reconstruction of soft manipulators using vision and IMU feedback', IEEE Robotics and Automation Letters (RA-L), July 2022, which is incorporated herein, in its entirety.

In some aspects, methods of manufacturing and assembling the manipulator are disclosed.

Design and Fabrication Principles

The exemplary manipulator is inspired by the human spinal column and comprises of vertebra as the fundamental building block, referred to as a tensegrity module or primitive as shown in FIG. 1. The exemplary manipulator solves design problems involving synthesis and fabrication of modules, inter-module assembly and their actuation. Five design principles, including module selection, identification of string paths, pre-stressing and structural stability, inter-modular docking and actuation were used in the development of the exemplary manipulator. Three terms for describing a tensegrity structure are defined herein: a link is the rigid and compression element while a string or cable is the compliant and tension element in the mechanism; and tendons are the tension elements that are actuated for affecting shape change. The graph G(V,E) of the mechanism comprises of vertices V and edges E which physically correspond to the connecting holes, and links or strings.

Module selection. A tensegrity module can be visualized as a base polyhedron, e.g., a prism, platonic, archemedian or Johnsons solid. Here the edges and vertices of the polyhedron physically correspond to the links or strings, and connection holes. The links may have different morphologies— straight or curved. This selection of link design is critical as, if not chosen appropriately, it may lead to scenarios when the mechanism fabrication is infeasible. Furthermore, link design includes the placement of connecting holes where the strings interact with the link. These correspond to the vertices of the aforementioned base polyhedron and graph G(V,E). The shape and placement of these holes play a key role in module stability.

Identification of string paths. Physical testing and experimentation iterations often lead to the desirable mechanism module. Thereby, there is a need for a cost- and time-efficient fabrication methodology. The time-efficient fabrication is achieved by methodically finding the Euler path of the graph corresponding to the module solid, in this case, a $J_{84}$ Johnsons solid (snub disphendoid). This path corresponds to the physical routing path of the string. The shape of the 6-dof manipulator is controlled using four Motor-Tendon Actuators (MTAs) routed on the outside of the manipulator and controlled using four motors located at the base. The modeling framework of this tensegrity manipulator uses the geometric Screw Theory (Lie Groups) approach for representation. In contrast to a commonly used node-based approach, this framework offers advantages of (a) the geometric basis where number of unknowns are proportional to the number of rigid links, (b) being applicable to complex morphologies (including multiple connections at a node), and (c) facilitates case of representation of forces and torques, with spring-tension model of compliant strings (tensile elements).

For tensegrity mechanisms, this challenge can be distilled to methodology for strategically connecting strings with links. Traditionally, one string per edge is used for connecting two vertices. However, this approach proves to be inefficient as it (a) can be unnecessarily tedious especially as the number of edges per vertex increases, and (b) does not ensure physical stability of the mechanism during the fabrication process, leading to a need for jigs. In contrast, it is much more efficient to identify a set of string paths that use the minimum number of strings. A string path is a sequence of edges between two vertices such that no edge is repeated. In graph theory, this is equivalent to an open or closed trail. This simplifies the process of pre-stressing and tightening of the strings. An example of this could be seen on the vertebra module (discussed later) where one string is used to fabricate the whole mechanism, an Eulerian path or trail in graph theory terminology. This results in no more than two strings at any vertex of the mechanism. In contrast, the one string per edge approach would result in four string ends being tied together and tightened at four different vertices, and two string ends at the other four vertices. However, unlike the vertebra module, not all tensegrity mechanisms will have a string path that can allow the use of only one string. Using graph theory and the well-known problem of the Bridges of Konigsberg (Euler, L., 1953. "Leonhard euler and the koenigsberg bridges". *Scientific American,* 189(1):66-72)," the number of edges at each vertex must be examined to determine the existence of an Eulerian path. The number of edges at each vertex must be even in order to use one string for the whole mechanism. The reason being, the number of strings entering and exiting the vertex must be the same. For example, a cube has eight vertices, and each vertex has three edges, therefore more than one string must be used, in this case, the minimum of four strings. The reason for being, for each of the eight odd vertices, at least one edge enters or exits the node without a paired edge that does the opposite. Since there are two ends to each string, the string is able to exit one vertex and enter another, hence, requiring at least four strings to traverse all the edges. This example illustrates that the minimum number of strings will be half of the number of odd vertices in a mechanism.

Pre-stressing and structural stability. Once the desired set of string paths has been identified, the next step involves effective pre-stressing of the strings. Here, the objective is to facilitate the change of string lengths between vertices in a simple and efficient manner to physically tune the form/shape of the mechanism. The solution methodology incorporates pinch points which are slots off the main hole that pinch the strings and use friction to resist their movement. Pinch points allow for changing the length of one string without compromising the others. Consequently, the string lengths between vertices can be changed until the desired form of the mechanism is achieved. Finally, the strings must be secured to ensure that the pre-stressed strings do not move, and the form is stable. This can be achieved using multiple approaches, e.g., use of nuts and bolts to tighten the strings, or a pin to resist any motion of the string to leave the pinch point.

Intermodular docking. The modular design approach affords versatility along with case and efficiency of fabrication. The concept of docking is adopted to simplify connecting one module to another. This can be viewed simplistically when considering rigid modules, however, in the case of tensegrity modules, it needs reconsideration. The concept of docking allows for the internal structure of the module to remain unchanged, however the external part of the module is modified to allow for easier inter-modular connections. The modules can be connected by using two different methods, vertex-to-vertex or string-to-vertex. The former connects a vertex of a link on one module to a vertex of a link on the other module. While the latter is the connection between a vertex on one module and a string on the other. An example of each can be seen in FIG. 2.

Actuation. The strings provide the mechanism with compliance that can be exploited to change the shape. There are multiple ways to actuate the system, in this case, the mechanism is actuated using Motor-Tendon Actuators (MTAs). In order to use tendon actuation, a path for the tendon must be designed into the mechanism while also having an origin (motor) and an insertion point (where it connects to the module). From the designer's perspective, the less number of actuators provides case of fabrication at the cost of control given the high non-linearity of the system.

EXAMPLE

Dexterous Continuum Tensegrity Manipulator. The vertebra, column fabrication, and actuation of the dexterous continuum tensegrity manipulator was performed using the principles described above.

Module selection and vertebra construction. The tensegrity mechanism based on the snub disphenoid was chosen as the vertebra module of the exemplary manipulator. The snub disphenoids were fabricated using ¼" Sande plywood (rigid element), ⅛" elastic nylon cord (tension-compliant element), M5×12 mm socket head cap screw, and M5 nut as illustrated in FIGS. 3a-3b. All the parts fabricated using wood were cut using a laser cutter. The curved link of the vertebra used two 3" outer diameter semicircles with an internal diameter of 2", referred to as the sub-vertebra. The sub-vertebra had four holes where the strings were attached to the link. In order to be able to maneuver the vertebra and the exemplary manipulator, tendons were connected to each vertebra. This was accomplished by the addition of a tendon attachment. The tendon attachment was a rectangle with the dimension of ⅞"×½" with a hole that allowed for passing of the tendon. The tendon attachment was fixed onto the sub-vertebra using a bucktooth design in which a rectangular slot was cut out of one of the narrower sides of the tendon attachment, FIG. 3b. This bucktooth design allowed for a stronger joint by distributing the forces over a larger area. The tendon attachment sustained a large force to affect change in the shape of the manipulator. Consequently, the strength of this joint was essential and two rectangular slots were used for each attachment. The resulting sub-vertebra can be seen in FIG. 3b.

Identification of string paths. The two sub-vertebrae and their connections are visualized using a graph corresponding to the snub disphenoid as shown in FIG. 4a. Here, the thin lines indicate the string (connected vertices), while bold lines indicate the unconnected vertices, i.e., links. As all the vertices in the graph were even (two or four string per vertex), there was a single Euler's path that traversed all thin lines (strings). Consequently, the fabrication of this vertebra was performed using a single string. An alternative path to run the string is illustrated in FIG. 5. All vertices are labeled with alpha-numeric labels and edges with numerical labels.

Pre-stressing and structural stability. Upon completion of 'stringing' of the mechanism, a bolt can be placed in each hole to secure the string in place. The manipulation of mechanism shape or form can be achieved by adjusting the tensions in the strings. This form-tuning process can be laborious. The exemplary manipulator simplified the process by including pinch points in the design as seen in FIG. 6a. Pinch points are helpful for several reasons. First, the string does not remain in the main hole, so it does not obstruct other strings that are required to be routed through the hole. Additionally, the string can be manipulated in and out of the pinch point in an efficient manner during the form-tuning process.

Figure 6B:
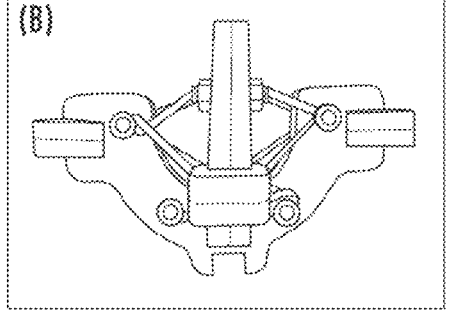
FIGS. 6B-6D show the resulting vertebra structure once the string is tightened, including front (FIG. 6B), top (FIG. 6C), and side (FIG. 6D) views.
Figure 6C:
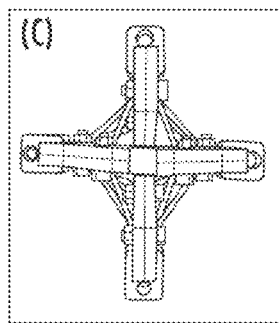
Figure 6D:
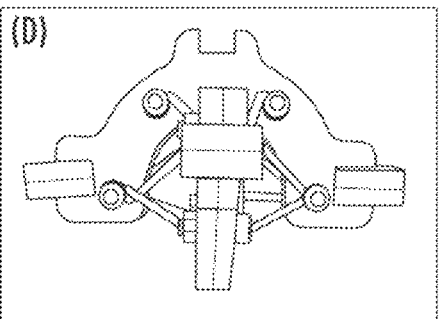

Once the form-tuning process was completed, the string was secured by using a nut and bolt. The resulting vertebra upon tightening the strings can be seen in FIGS. 6b-d. The time taken for a person to fabricate a vertebra was investigated by observing this methodology on five different subjects. Each subject was provided with all the materials and were tasked to route the strings and perform form-tuning. On an average, for a subject familiar with the process, this time is between ten to fifteen minutes.

Intermodular docking. The manipulator was assembled using the vertex-to-vertex docking approach. The design resembled a bucktooth at the top of the curved link of the sub-vertebra. In the exemplary manipulator, the bucktooth was outside the sub-vertebra, which provided a wide range of motion of the manipulator column.

Each vertebra was attached to the next by interlocking the buckteeth. To strengthen the joint connections of the column, adhesives were used. There were a total of ten connected vertebrae modules in the manipulator column, resulting in a total length of 60 cm.

Actuation. The Motor-Tendon Acuators (MTAs) was integrated into the fabricated continuum manipulator to facilitate shape change. The exemplary manipulator was placed on the base of dimension 12"×12"×4". Slots were cut in the base plate that were the same size of the assembly connector of the vertebra. To further support the exemplary manipulator, a boat-like support was used to cradle the bottom vertebra. The front and rear sides of the boat-like support cradled the bottom of the sub-vertebra. The base contained four motors housed below the base plate. Along with the slots to house the bottom vertebra, the base plate also contained four slots for the tendons to pass through. The tendons were fixed to the tendon attachments of the top vertebra and were run along each of the four sides of the manipulator through the holes in the sub-vertebra bucktooth attachments and ended at the motors. The motors were run using an Arduino Mega microcontroller and four DRV8825 stepper motor drivers. Each MTA was controlled individually to allow for movement of the manipulator. A pose of the exemplary manipulator can be seen in FIG. 7a.

The wood-based exemplary modulator of 60 cm had a weight of 700 grams and was capable of lifting objects. FIGS. 7b and 7c show the manipulator lifting a water bottle of approximately the same weight as itself. The weight carrying capability of the robot was dependent on the choice of materials (links and strings), and the actuators (motors). Modeling the Sub-Vertebrae A model description of the sub-vertebrae of the exemplary manipulator considers tensegrities and the antagonistic nature of the tension-compression elements; multiple connections between elements, which result in closed kinematic chains; and the compliant behavior of the strings, which is piece-wise continuous, incorporates further nonlinearity in the system. A common approach to modeling is the node-based approach (Skelton, R. E., et al. 2009. Analysis of Tensegrity Dyanmics". I Tensegrity Systems, M. C. Oliveira and R. E. Skelton eds., Springer U S, Boston, M A, pp. 157-158), in which, the system unknowns increase with the number of nodes, their application to complex morphologies (e.g., multiple connections at a node) is unknown, the representation of a wrench has to be in the global coordinate system and most importantly, the use of force density to linearly model the cables does not incorporate compliance. In contrast, a Screw Theory approach using Lic Groups that circumvents the aforementioned challenges was used to model the sub-vertebrae of an exemplary manipulator. A comparison of the two models is shown in Table 1. Additionally, the node-based approach models the strings as tensile forces that do not change length, whereas the proposed approach views strings as a spring until the string is stretched to its maximum length where it then becomes pure tension.

System Description

In some aspects, a manipulator is constructed based on the following principles and practices. In a general example of a manipulator of the disclosure, the exemplary manipulator comprises multiple serially connected vertebrae to construct a virtual open chain. Each vertebra consists of two curved links called sub-vertebrae and twelve strings. All the strings are assumed to have free-lengths $l_{o,j}$ $\forall j=1, \ldots, 12$. Let the relationship between the coordinate systems of the two sub-vertebrae be defined using a screw $\xi$ as shown in FIGS. 8a and 8b. Each sub-vertebra has four connection points or nodes that will be defined as A, B, C, and D. Additionally, each vertex is at some defined distance from the center of mass that does not change with time and is consistent for each sub-vertebra.

TABLE 1

Comparison between traditional approach
and one proposed in this research.

|  | Node-Based (Traditional) | Lie Group/ Screw Theory (Proposed) |
| --- | --- | --- |
| Unknowns (β links) | $3 \times 4\beta = 12\beta$ | $6 \times \beta = 6\beta$ |
| Complex morphologies (e.g., multiple connections) | Performance Unknown | Works very well |
| Force and torque representation | Global coordinate system (tough to change to local) | Local or global coordinate system (ease of representation) |
| Nonlinear Constraints | Length Constraints | None |
| Cable Tensile Force | Tension | Spring + Tension |

Figure 9:
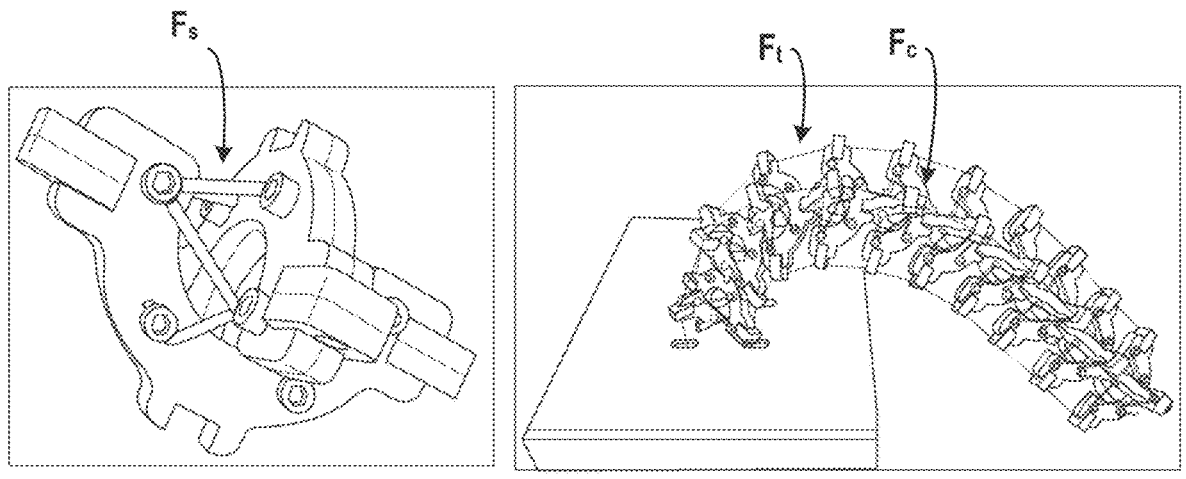
FIG. 9 shows the fifteen total forces acting on each sub-vertebra. Twelve from the strings, two from the tendons, and one from the connection to the adjoining sub-vertebra.

Each vertebra is serially connected to the neighboring modules via the top and bottom of each vertebra where the top and bottom are defined as the outermost point of each sub-vertebra halfway between node B and C. This connection point distributes a force between each sub-vertebra. The vertebra is actuated by using tendons which run along the outside of each sub-vertebra along nodes A and D. Therefore, there is a total of fifteen forces acting on each sub-vertebra, the twelve string forces ($F_s$), two tendon forces ($F_t$), and single connection force ($F_m$), FIG. 9.
Framework for Representing Connections are Shown Below.

Let the number of vertices and string connections be $N_n$ $N_c$ respectively. Let the node matrix $P \in \mathbb{R}^{4 \times N_n}$ be the collection of node vectors from the center of mass.

$$P = [p_a, p_b, p_c, p_d, \ldots] \in \mathbb{R}^{4 \times N_n} \tag{1}$$

where $P_i \in \mathbb{R}^{4 \times 1}$ is the homogeneous representation of a node point. The string vector matrix $S \in \mathbb{R}^{4 \times N_c}$ is calculated by finding the difference between two nodes on two separate sub-vertebrae. Let the connection matrix $C_i \in \mathbb{R}^{N_n \times N_c}$ for sub-vertebrae i be defined as $$C_i[j, k] = \begin{cases} 1 & \text{if string } k \text{ contains vertex } j \\ 0 & \text{otherwise} \end{cases} \tag{2}$$

The connection matrices $C_1, C_2 \in \mathbb{R}^{4 \times 12}$ for the presented sub-vertebrae are:

$$C_1 = \begin{bmatrix} 1 & 0 & 0 & 0 \\ 1 & 0 & 0 & 0 \\ 1 & 0 & 0 & 0 \\ 1 & 0 & 0 & 0 \\ 0 & 1 & 0 & 0 \\ 0 & 1 & 0 & 0 \\ 0 & 0 & 1 & 0 \\ 0 & 0 & 1 & 0 \\ 0 & 0 & 0 & 1 \\ 0 & 0 & 0 & 1 \\ 0 & 0 & 0 & 1 \\ 0 & 0 & 0 & 1 \end{bmatrix}^T,$$

16

-continued

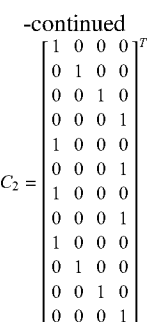

$$C_2 = \begin{bmatrix} 1 & 0 & 0 & 0 \\ 0 & 1 & 0 & 0 \\ 0 & 0 & 1 & 0 \\ 0 & 0 & 0 & 1 \\ 1 & 0 & 0 & 0 \\ 0 & 0 & 0 & 1 \\ 1 & 0 & 0 & 0 \\ 0 & 0 & 0 & 1 \\ 1 & 0 & 0 & 0 \\ 0 & 1 & 0 & 0 \\ 0 & 0 & 1 & 0 \\ 0 & 0 & 0 & 1 \end{bmatrix}^T$$

The transformation matrix $T_{12} \in SE(3)$ that transforms vectors from coordinate system {2} to {1} is defined using matrix exponential:

$$T_{12} = \exp(\hat{\xi}) = \exp(\hat{\mathcal{V}}t) \tag{3}$$

where $\xi$, $\mathcal{V} \in \mathbb{R}^{6 \times 1}$ are the screw and twist associated with the two coordinate systems and t is time. The hat operator transforms these vectors to se(3).

The string matrix S is the collection of displacement vectors of the strings. As these are free-vectors, the last row of this matrix is always zero. The subscripts 1, 2 associated with S denote the representation of the string displacement vectors in coordinate systems {1} or {2}

$$S_1 = PC_1 - T_{12}PC_2 \tag{4}$$

$$S_2 = PC_2 - T_{12}^{-1}PC_1 = T_{12}^{-1}S_1 \tag{5}$$

where $S_1 \in \mathbb{R}^{4 \times N_c}$. The jth column of the matrix corresponds to the displacement vectors of the jth connection, and the norm is the length of the string.

$$s_j = col_j(S), l_j = |s_j| \tag{6}$$

Figure 10:
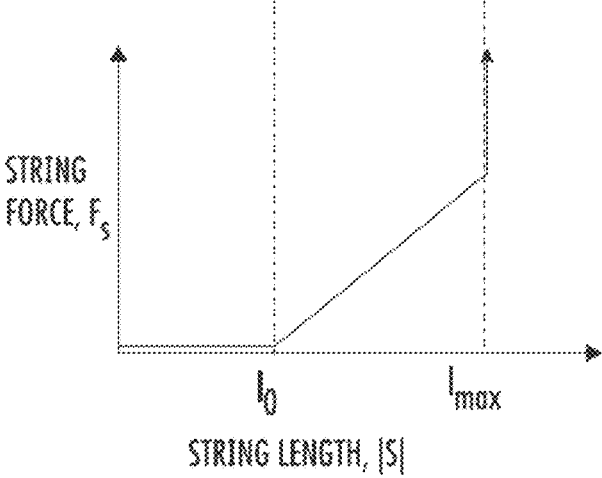
FIG. 10 shows the string length with respect to the force applied to the string. The plot shows the piecewise nature of the string which introduces nonlinearities into the system.

In the following description, it is contemplated that the strings are firmly fixed between the vertices (holes).
String Force Model The compliance in the tensegrity mechanism is imparted by the strings that exhibit spring-tension behavior. The string length to force relationship can be thought about in three regions, FIG. 10: (a) slack—the string length is shorter than the zero free length (ZFL) $l_0$ resulting in zero force, (b) spring—the force is generated as per Hooke's law, and (c) tension-force has been exerted on the string to where it has reached its maximum length $l_{max}$, meaning the force exerted on the string is now a combination of a spring and pure tension force. Consequently, the force in string j now can be defined as $$f_{s,j} = \begin{cases} 0 & l_j < l_0 \\ \dfrac{k_j(l_j - l_0)}{l_j} & l_j < l_0 < l_{max} \\ \dfrac{k_j(l_{max,j} - l_0 + l_{t,j})}{l_j} & l_j = l_{max} \end{cases} \tag{7}$$

where $l_j = |s_j|, s_j = col_j(S)$

The force vector $f_s \in \mathbb{R}^{N_c \times 1}$ and matrix $F_s \in \mathbb{R}^{N_c \times N_c}$ are $$f_s = [f_{s,1}, f_{s,2}, \dots]^T, \quad F_s = \mathrm{diag}(f_s) \tag{8}$$

Consequently, the wrench due to the string forces, $F_s$, is $$\mathcal{F}_s = \begin{bmatrix} \sum_{j=1}^{N_c} f_{s,j} s_j \\ \sum_{j=1}^{N_c} r_j \times f_{s,j} s_j \end{bmatrix}, \quad r_j = col_j(PC) \tag{9}$$

Dynamics of a Single Vertebra

A problem is formulated using the Newton-Euler approach that can be later iteratively extended to the whole manipulator with multiple modules. Consider a single rigid sub-vertebra such that the origin is placed at its center of mass, FIG. 8a, i.e., $\int r \cdot dm = 0$. Assume the sub-vertebrae is moving in space with body twist $V_b$ that is composed of body angular velocity $\omega_b$ and linear velocity $v_b$ of the origin of the body coordinate system expressed in {b}.

$$\mathcal{V}_b = \begin{bmatrix} \omega_b^T, & v_b^T \end{bmatrix}^T$$

Conservation of linear and angular momentum results in $$\begin{bmatrix} m_b \\ f_b \end{bmatrix} = \begin{bmatrix} I_b & 0 \\ 0 & m1 \end{bmatrix} \begin{bmatrix} \omega_b \\ v_b \end{bmatrix} + \begin{bmatrix} \hat{\omega}_b & 0 \\ 0 & \hat{\omega}_b \end{bmatrix} \begin{bmatrix} I_b & 0 \\ 0 & m1 \end{bmatrix} \begin{bmatrix} \omega_b \\ v_b \end{bmatrix} \tag{10}$$

$$\mathcal{F}_b = \mathcal{G}_b \mathcal{V}_b - (ad_{V_b})^T \mathcal{G}_b \mathcal{V}_b$$

where $m_b$, $f_b$ are the moment and force; $m$, $l_b$ are the mass and moment of inertia of the rigid link; and $\mathcal{G}_b$ is the spatial inertia matrix, all expressed in body coordinate system.

$$\mathcal{G}_b = \begin{bmatrix} I_b & 0 \\ 0 & m1 \end{bmatrix}$$

The adjoint of the body twist $adv_b$ is defined as $$ad_{V_b} = \begin{bmatrix} \hat{\omega}_b & 0 \\ \hat{v}_b & \hat{\omega}_b \end{bmatrix}$$

Here the hat operator is the skew symmetric operator takes $\mathbb{R}^{3 \times 1} \rightarrow s0(3)$.

The wrench of the sub-vertebra is the sum of the forces and moments acting on the link. This can be written as:

$$\mathcal{F}_b = \mathcal{F}_s + \mathcal{F}_t + \mathcal{F}_m \text{ s.t.} \tag{11}$$

$$\mathcal{F}_s = \begin{bmatrix} \sum_k F_{tk} \\ \sum_k r_{t,k} \times F_{tk} \end{bmatrix}$$

where the wrench of the twelve string $\mathcal{F}$ is defined in (9); $F_{tk}$, $r_{t,k}$ is one of the two tendon forces, and the displacement of the tendon from the CoM; and $F_m$, $r_m$ is the connection force and the location of the connection from the CoM. The moment arms of the forces for the tendon $r_{t,k}$, connection point $r_m$ and strings $r_{s,j}$ will be known and constant. In case of forward kinematics, the tendon forces can be assumed to be known. As observable, the nonlinearity in the system is introduced through the string wrench term-(a) due to the behavior of the strings (7), and (b) inverse proportionality to the length of the string $l_j$. It is worth reminding the reader that the frictional interaction between the MTAs and the vertebra can be incorporated in $\mathcal{F}_t$.

These dynamics do not consider damping in the system. The linear viscous damping in the individual string is $$f_{sd,j} = c_j \frac{d}{dt}(l_j) = c_j \frac{d}{dt}\left(\sqrt{s_j^T s_j}\right) = \frac{c_j}{l_j}\left(s_j^T \frac{ds_j}{dt}\right) \tag{12}$$

where $c_j$ is the string $j$ damping coefficient, which are assembled as a damping vector $c \in \mathbb{R}^{N_c \times 1}$. This can be incorporated into the system dynamics by modifying the string forces to $$\tilde{f}_{s,j} = (f_{s,j} + f_{sd,j}) s_j, \text{ where } \dot{s}_j = col_j(\dot{S}_2) \tag{13}$$

$$\dot{S}_2 = -\dot{T}_{12}^{-1} PC_1 = T_{12}^{-1} \dot{T}_{12} T_{12}^{-1} PC_1 = \hat{V}_b T_{12}^{-1} PC_1$$

To facilitate simulation of these dynamic equations, the state space representation is $$\begin{bmatrix} \mathcal{V}_b \\ \dot{\mathcal{V}}_b \end{bmatrix} = \begin{bmatrix} 0 & 1 \\ 0 & G_b^{-1}(ad_{V_b})^T G_b \end{bmatrix} \begin{bmatrix} \xi_b \\ \mathcal{V}_b \end{bmatrix} + \begin{bmatrix} 0 \\ G_b^{-1} \mathcal{F}_b \end{bmatrix} \tag{14}$$

$$\begin{bmatrix} \mathcal{V}_b \\ \dot{\mathcal{V}}_b \end{bmatrix} = \begin{bmatrix} 0 & 1 \\ 0 & G_b^{-1}(ad_{V_b})^T G_b \end{bmatrix} \begin{bmatrix} \xi_b \\ \mathcal{V}_b \end{bmatrix} + \begin{bmatrix} 0 \\ G_b^{-1} \mathcal{F}_b \end{bmatrix}$$

Figure 11:
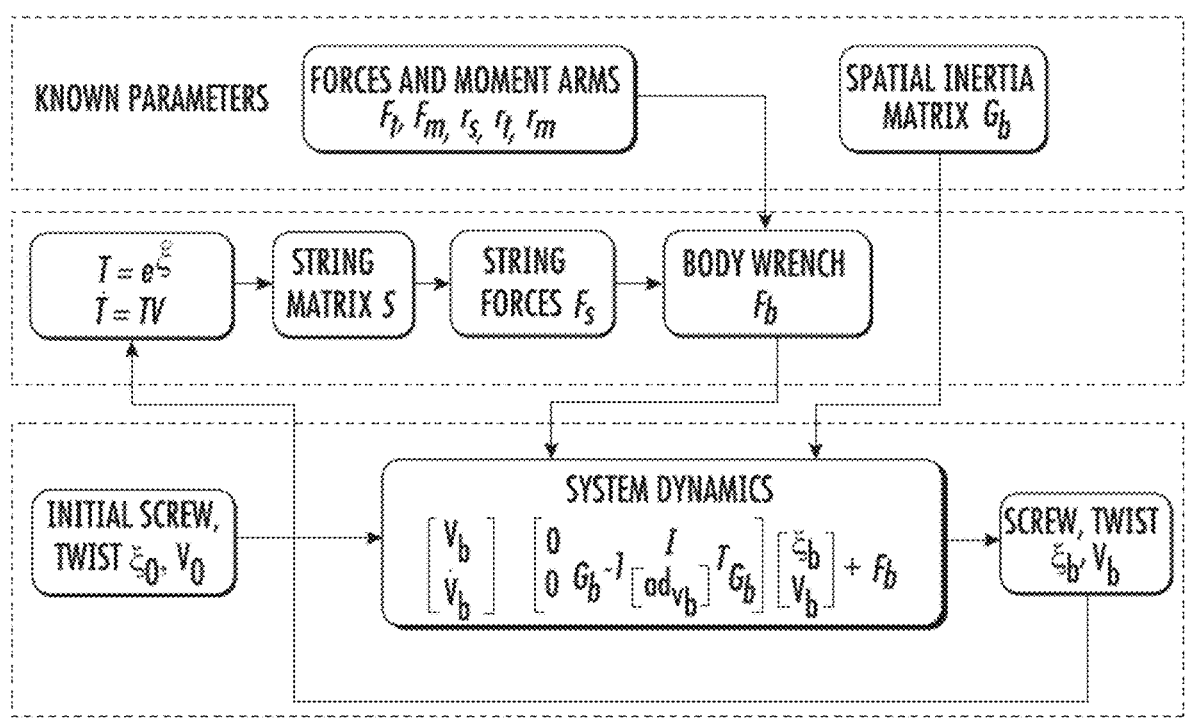
FIG. 11 shows the block diagram indicating the flow of data for state space dynamics derived using Newton-Euler approach.

The flow of data for the simulation is visualized in FIG. 11.

Static Form-Finding

The form-finding problem is formulated as finding & such that $$\mathcal{F}_s + \mathcal{F}_t + \mathcal{F}_{ext} = 0 \tag{15}$$

where the tendon and external wrenches, $\mathcal{F}_t, \mathcal{F}_{ext}$, are known. This problem can be re-stated as a root-finding problem of six variables corresponding to $\xi$.

Figure 12:
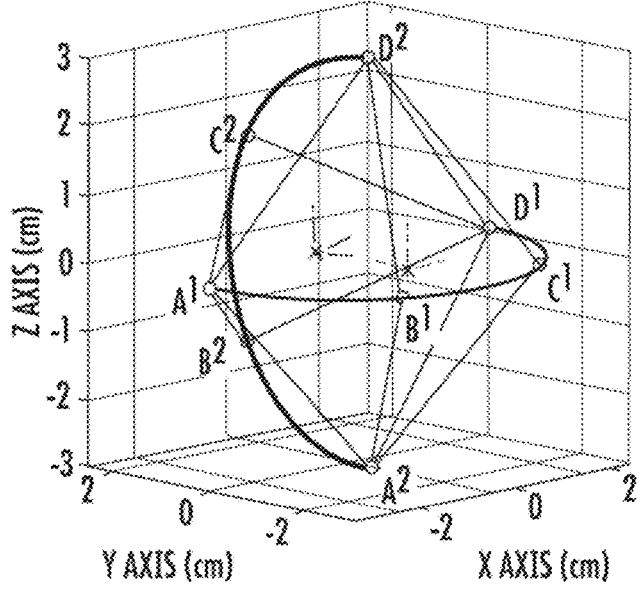
FIG. 12 shows a simulation of static form-finding where the strings have the slack-spring-tension behavior.

We examine two numerical examples, with and without external force exerted on a single vertebra. The string stiffness is assumed to be same for all strings as k=.77N/cm with different free-lengths are tabulated in Tab. 2 where the maximum length is 2 cm longer than each free-length; and identical sub-vertebrae where the vertices from the COM are A=[−3.0162, 0, 0]$^T$, B=[−1.5240, −2.6035, 0]$^T$, C=[3.0162, 0, 0]$^T$, D=[1.5240, −2.6035, 0]$^T$. The resulting form of the mechanism is visualized in FIG. 12. Here, the screw defining the relationship between the two coordinate systems is $\xi_b$=[2.2214, 0, 2.2214, −0.5619, 0, 0.5619]$^T$. The coordinates of vertices on curved link 2 can be calculated using the transformation matrix calculated using (3).

TABLE 2

String lengths for the static form finding simulations
when external force is zero and non-zero. The highlighted
rows indicate the slack state of the string.

| String | $F_{ext} = [0, 0, 0]^T$ N | | $F_{ext} = -[0, 0.75, 0.5]^T$ N | |
| | $l_0$(cm) | l(cm) | $l_0$(cm) | l(cm) |
| --- | --- | --- | --- | --- |
| $A^1A^2$ | 3.81 | 4.2955 | 3.81 | 4.1893 |
| $A^1B^2$ | 3.175 | 3.9775 | 3.175 | 3.4732 |
| $A^1C^2$ | 3.175 | 3.9775 | 3.175 | 3.6708 |
| $A^1D^2$ | 3.81 | 4.2955 | 3.81 | 4.5105 |
| $B^1A^2$ | 3.175 | 3.9775 | 3.175 | 2.8523 |
| $B^1D^2$ | 3.175 | 3.9775 | 3.175 | 4.8663 |
| $C^1A^2$ | 3.175 | 3.9775 | 3.175 | 3.1701 |
| $C^1D^2$ | 3.175 | 3.9775 | 3.175 | 4.5692 |
| $D^1A^2$ | 3.81 | 4.2955 | 3.81 | 4.6192 |
| $D^1B^2$ | 3.175 | 3.9775 | 3.175 | 4.5084 |
| $D^1C^2$ | 3.175 | 3.9775 | 3.175 | 4.1256 |
| $D^1D^2$ | 3.81 | 4.2955 | 3.81 | 3.8465 |

Figure 13:
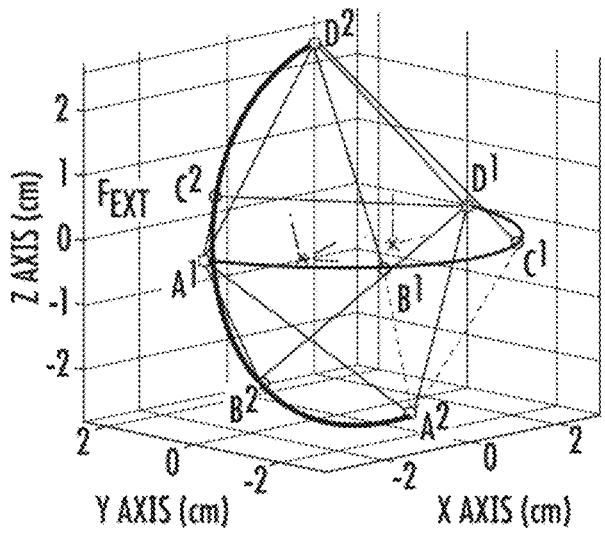
FIG. 13 shows the form finding with a non-zero force. Strings $A^2C^1$, $A^2B^1$ (dashed) are slack and have no force as the length between the vertices is less than the ZFL.
Figure 14:
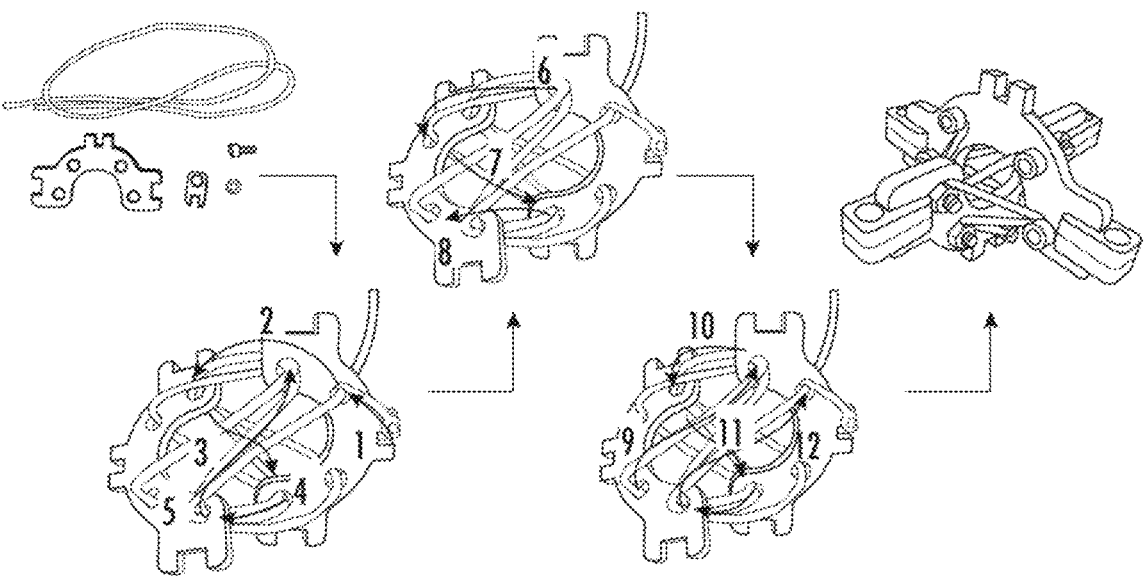
FIG. 14 shows a schematic for assembling the disclosed device.

The static form with an external force $F_{ext}$ [ON, −0.75N, −0.5N]$^T$ applied to node $A^1$ results in the orientation shown in FIG. 13. Here, two of the strings become slack indicated by dashed lines, i.e., the first region in FIG. 10. The body screw $\xi_b$=[2.1893, 0.6886, 1.8180, −0.5224, −0.0322, 0.6336]$^T$. Such scenarios are observed during experiments when multiple strings become slack upon application of force on the mechanism.

Controller Architecture

Referring now to FIG. 18, a schematic diagram of the controller 1800 is shown according to an example implementation. As shown in FIG. 18, the controller 1800 includes a processing circuit 1810 having a processor and a memory device, a control system 1820 having a circuit A 1821, a circuit B 1822, and a circuit C 1823, and a communications interface 1840. Generally, the controller 1800 is structured to perform closed-loop and/or sensor fused control of the manipulator.

In one configuration, the circuits of the control system 1820 are in the form of machine or computer-readable media that is executable by a processor, such as processor. As described herein, the machine-readable media facilitates performance of certain operations to enable reception and transmission of data. For example, the machine-readable media may provide an instruction (e.g., command, etc.) to acquire data. In this regard, the machine-readable media may include programmable logic that defines the frequency of acquisition of the data (or, transmission of the data). The computer readable media may include code written in any programming language. The computer readable program code may be executed on one processor, multiple co located processors, multiple remote processors, or any combination of local and remote processors. Remote processors may be connected to each other through any type of network (e.g., CAN bus, etc.).

In another configuration, the circuits of the control system 1820 are implemented as hardware units, such as electronic control units. As such, the circuits of the control system 1820 may be implemented as one or more circuitry components including, but not limited to, processing circuitry, network interfaces, peripheral devices, input devices, output devices, sensors, etc. In some implementations, the circuits of the control system 1820 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the circuits of the control system X may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on). The circuits of the control system 1820 may also include programmable hardware devices such as field programmable gate arrays, programmable array logic, programmable logic devices or the like. The circuits of the control system 1820 may include one or more memory devices for storing instructions that are executable by the processor(s) of the circuits of the control system 1820. The one or more memory devices and processor(s) may have the same definition as provided below with respect to the memory device and processor. In some hardware unit configurations, the circuits of the control system 1820 may be geographically dispersed throughout separate locations in the power system. Alternatively and as shown, the circuits of the control system 1820 may be implemented in or within a single unit/housing, which is shown as the controller 1800.

In the example shown, the controller 1800 includes the processing circuit X having the processor and the memory device. The processing circuit 1810 may be structured or configured to execute or implement the instructions, commands, and/or control processes described herein with respect to the circuits of the control system 1820. The depicted configuration represents the circuits of the control system 1820 as machine or computer-readable media. However, as mentioned above, this illustration is not meant to be limiting as the present disclosure contemplates other implementations where the circuits of the control system 1820, or at least one circuit of the circuits of the control system 1820, is configured as a hardware unit. All such combinations and variations are intended to fall within the scope of the present disclosure.

The hardware and data processing components used to implement the various processes, operations, illustrative logics, logical blocks, modules and circuits described in connection with the implementations disclosed herein (e.g., the processor) may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, or state machine. A processor also may be implemented as a combination of computing devices, such as a combination of a DSP and a microprocessor, a plurality of microprocessors, one or more microprocessors in conjunction with a DSP core, or any other such configuration. In some implementations, the one or more processors may be shared by multiple circuits (e.g., the circuits of the control system 1820 may comprise or otherwise share the same processor which, in some example implementations, may execute instructions stored, or otherwise accessed, via different areas of memory). Alternatively or additionally, the one or more processors may be structured to perform or otherwise execute certain operations independent of one or more co-processors. In other example implementations, two or more processors may be coupled via a bus to enable independent, parallel, pipelined, or multi-threaded instruction execution. All such variations are intended to fall within the scope of the present disclosure.

The memory device (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory device may be communicably connected to the processor to provide computer code or instructions to the processor for executing at least some of the processes described herein. Moreover, the memory device may be or include tangible, non-transient volatile memory or non-volatile memory. Accordingly, the memory device may include database components, object code components, script components, or any other type of information structure for supporting the various activities and information structures described herein.

The circuit A 1821 is structured to processes sensor input. The circuit B 1822 is structured to control the plurality of actuators. The circuit C 1823 is structured to control the means for gripping.

The controller may further include a communication interface 1840 through which communication between the control system 1820, the processing circuit 1810, and external system 1830, 1831, 1832, and 1833 are processed.

External system 1830 relates to a control device monitor, External system 1831 relates to the plurality of actuators. External system 1832 relates to any number of sensors. External system 1833 optionally relates to a user remote control.

While various circuits with particular functionality are shown in FIG. 18, it should be understood that the controller 1800 may include any number of circuits for completing the functions described herein. For example, the activities and functionalities of the circuits of the control system 1820 may be combined in multiple circuits or as a single circuit. Additional circuits with additional functionality may also be included. Further, the controller 1800 may further control other activity beyond the scope of the present disclosure. In some implementations, the circuits described herein may include one or more processing circuits comprising one or more memory devices coupled to one or more processors, the one or more memory devices configured to store instructions thereon that, when executed by the one or more processors, cause the one or more processors to perform the operations performed herein and described with reference to circuits.

As mentioned above and in one configuration, the "circuits" may be implemented in machine-readable medium for execution by various types of processors, such as the processor of FIG. 18. An identified circuit of executable code may, for instance, comprise one or more physical or logical blocks of computer instructions, which may, for instance, be organized as an object, procedure, or function. Nevertheless, the executables of an identified circuit need not be physically located together but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits and may be implemented in any suitable form and organized within any suitable type of data structure. The operational data may be collected as a single data set or may be distributed over different locations including over different storage devices, and may exist, at least partially, merely as electronic signals on a system or network.

While the term "processor" is briefly defined above, the term "processor" and "processing circuit" are meant to be broadly interpreted. In this regard and as mentioned above, the "processor" may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some implementations, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

Implementations within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

CONCLUSION

The modular design approach facilitates assembly of ten 'vertebra' modules comprising of two links and twelve strings. The fabrication approach involves finding the Euler path on the equivalent graph of the module-a Johnsons $J_{84}$ solid. Here, the edges represent the string connections and the Euler path traverses each edge once. Subsequently, the fabrication of a module is accomplished by routing a single string. Design modifications to the mechanism are incorporated to ensure the structural stability and tuning ability of the mechanism. The resulting semi-rigid, continuum manipulator is capable of conforming to desirable shapes to accomplish tasks in its workspace. Unlike traditional rigid manipulators where actuators are located along the arm, location of the Motor Tendon Actuators (MTAs) at the base results in centralization of the majority of the weight of the actuators with negligible effect on the manipulator dynamics. A single module is modeled using the Newton-Euler approach with Screw Theory representation. This disclosure teaches the framework for representing tensegrity connections, modeling of the non-linear behavior of the compliant strings. The dynamics of a single vertebra is modeled and discussed. This also includes damping due to strings. The numerical examples for form-finding include scenarios with and without external force acting on the mechanism. The simulation does indicate slack-behavior of a couple of springs upon application of external force as observed during physical interaction with the module.

It is contemplated that the methodology may be extended to model to multiple modules as an iterative approach to model the complete manipulator. The simulation of DexTeR and its physical open-loop control for validation are the logical steps.

For the purposes of this description, certain advantages and novel features of the aspects and configurations of this disclosure are described herein. The described methods, systems, and apparatus should not be construed as limiting in any way. Instead, the present disclosure is directed toward all novel and nonobvious features and aspects of the various disclosed aspects, alone and in various combinations and sub-combinations with one another. The disclosed methods, systems, and apparatus are not limited to any specific aspect, feature, or combination thereof, nor do the disclosed methods, systems, and apparatus require that any one or more specific advantages be present, or problems be solved.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

Features disclosed in this specification (including any accompanying claims, abstract, and drawings), and/or all of the steps of any method or process so disclosed, may be combined in any combination, except combinations where at least some of such features and/or steps are mutually exclusive. The claimed features extend to any novel one, or any novel combination, of the features disclosed in this specification (including any accompanying claims, abstract, and drawings), or to any novel one, or any novel combination, of the steps of any method or process so disclosed.

As used in the specification and the appended claims, the singular forms "a", "an", and "the" include plural referents unless the context clearly dictates otherwise. Ranges may be expressed herein as from "about" one particular value, and/or to "about" another particular value. When such a range is expressed, another aspect includes from the one particular value and/or to the other particular value. Similarly, when values are expressed as approximations, by use of the antecedent "about", it will be understood that the particular value forms another aspect. It will be further understood that the endpoints of each of the ranges are significant both in relation to the other endpoint, and independently of the other endpoint. The terms "about" and "approximately" are defined as being "close to" as understood by one of ordinary skill in the art. In one non-limiting aspect the terms are defined to be within 10%. In another non-limiting aspect, the terms are defined to be within 5%. In still another non-limiting aspect, the terms are defined to be within 1%.

The terms "coupled", "connected", and the like as used herein mean the joining of two members directly or indirectly to one another. Such joining may be stationary (e.g., permanent) or moveable (e.g., removable or releasable). Such joining may be achieved with the two members, or the two members and any additional intermediate members being integrally formed as a single unitary body with one another or with the two members or the two members and any additional intermediate members being attached to one another. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. For example, circuit A communicably "coupled" to circuit B may signify that the circuit A communicates directly with circuit B (i.e., no intermediary) or communicates indirectly with circuit B (e.g., through one or more intermediaries).

Certain terminology is used in the following description for convenience only and is not limiting. The words "right", "left", "lower", and "upper" designate direction in the drawings to which reference is made. The words "inner" and "outer" refer to directions toward and away from, respectively, the geometric center of the described feature or device. The words "distal" and "proximal" refer to directions taken in context of the item described and, with regard to the instruments herein described, are typically based on the perspective of the practitioner using such instrument, with "proximal" indicating a position closer to the practitioner and "distal" indicating a position further from the practitioner. The terminology includes the above-listed words, derivatives thereof, and words of similar import.

Throughout the description and claims of this specification the word "comprise" and other forms of the word, such as "comprising" and "comprises," means including but not limited to, and is not intended to exclude, for example, other additives, components, integers, or steps.

"Optional" or "optionally" means that the subsequently described event or circumstance can or cannot occur, and that the description includes instances where the event or circumstance occurs and instances where it does not.

What is claimed is:

1. A manipulator comprising a plurality of modules interlocked to form a linear arrangement of modules, wherein a module comprises:

two rigid elements each defining a plurality of connection holes, wherein the two rigid elements do not touch, wherein each of the two rigid elements comprises an assembly connector, whereby the plurality of modules are coupled by interlocking assembly connectors of respective modules; and a single continuous string or cord routed through the plurality of connection holes of the two rigid elements to form a plurality of tension-compliant elements extending between the two rigid elements.

2. The manipulator of claim 1, wherein at least one of the two rigid elements comprises a two-dimensional shape forming a half-circle and the assembly connector is oriented radially.

3. The manipulator of claim 1, wherein the single continuous string or cord is a prestressed string or cord.

4. The manipulator of claim 1, wherein the module comprises a polyhedron shape, wherein edges and vertices of the polyhedron shape are formed by the plurality of tension-compliant elements and the plurality of connection holes of the two rigid elements.

5. The manipulator of claim 1, wherein the plurality of modules are rigidly coupled by interlocking the assembly connector of respective modules.

6. The manipulator of claim 1, wherein the plurality of tension-compliant elements are secured to the two rigid elements with a rigid assembly, wherein the rigid assembly prevents movement between a tension compliant element and a rigid element.

7. The manipulator of claim 1, wherein the module further comprises a first tendon connector and a second tendon connector each oriented radially and equally spaced on either side of the assembly connector, the first and second tendon connectors each comprising a tendon attachment, wherein each tendon attachment comprises a hole through which a tendon is positioned.

8. The manipulator of claim 7, further comprising a plurality of actuators positioned at a proximal end of the manipulator, a plurality of tendons connecting the plurality of actuators and the plurality of modules, and a means for gripping at a distal end of the manipulator, wherein a number of tendons and number of actuators are the same.

9. The manipulator of claim 8, wherein the plurality of actuators comprises motor-tendon actuators.

10. The manipulator of claim 8, comprising ten modules, four tendons, and four actuators, wherein each module comprises twelve tension-compliant elements formed by the single continuous string or cord and four holes in each of the two rigid elements.

11. A device comprising a plurality of manipulators of claim 10.

12. The device of claim 11, further comprising a base plate, wherein the base plate is positioned above the plurality of actuators and below a first module from the proximal end of the plurality of manipulators.

13. The device of claim 11, further comprising a base housing, wherein the base housing encases the plurality of actuators and a control unit, and wherein a plurality of wheels and mounts are coupled to the base housing.

14. The manipulator of claim 8, further comprising a base plate, wherein the base plate is positioned above the plurality of actuators and below a first module from the proximal end of the manipulator.

15. The manipulator of claim 14, further comprising a base housing, wherein the base housing encases the plurality of actuators, and a control unit.

16. The manipulator of claim 15, wherein a plurality of wheels or a plurality of mobile legs are coupled to the base housing.

17. The manipulator of claim 8, wherein one or more sensors are coupled to the modules of the manipulator.

18. The manipulator of claim 1, wherein the two rigid elements of the module comprises a first rigid element and a second rigid element oriented at a 90-degree angle to the first rigid element relative to a longitudinal axis of the linear arrangement of modules.

19. The manipulator of claim 1, wherein the module is a first module comprising a first rigid element and a second rigid element, wherein the assembly connector of the first rigid element projects from the first rigid element to interlock and overlap with at least a portion of an assembly connector of a third rigid element of a second module.

20. The manipulator of claim 1, further comprising one or more pinch points disposed in at least one of the plurality of connection holes, the one or more pinch points being adjustable to adjust tension in the single continuous string or cord.

\*    \*    \*    \*    \*